US011468733B2

(12) United States Patent
Winston

(10) Patent No.: US 11,468,733 B2
(45) **Date of Patent: *Oct. 11, 2022**

(54) WHEEL DISPLAY WITH MOVEABLE SEGMENTS

(71) Applicant: Aristocrat Technologies Australia Pty Limited, North Ryde (AU)

(72) Inventor: Eric P. Winston, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,420

(22) Filed: Dec. 10, 2020

(65) Prior Publication Data

US 2021/0097806 A1 Apr. 1, 2021

Related U.S. Application Data

(63) Continuation of application No. 16/213,830, filed on Dec. 7, 2018, now Pat. No. 10,902,696, which is a continuation-in-part of application No. 16/177,248, filed on Oct. 31, 2018, now Pat. No. 10,713,880.

(60) Provisional application No. 62/733,058, filed on Sep. 18, 2018.

(51) Int. Cl.

| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |
| *G09F 9/37* | (2006.01) |

(52) U.S. Cl.
CPC ...... *G07F 17/3213* (2013.01); *G07F 17/3216* (2013.01); *G09F 9/37* (2013.01)

(58) Field of Classification Search
USPC ........................ 463/1, 22, 25, 30, 31, 39, 40
See application file for complete search history.

(56) References Cited

U.S. PATENT DOCUMENTS

| | | | |
|---|---|---|---|
| 3,752,196 | A | 8/1973 | Mayeur |
| 5,717,423 | A | 2/1998 | Parker |
| 5,793,918 | A | 8/1998 | Hogan |
| 5,848,932 | A | 12/1998 | Adams |
| 6,189,246 | B1 | 2/2001 | Gorthala |
| 6,880,826 | B2 | 4/2005 | Inoue |
| 6,940,209 | B2 | 9/2005 | Henderson |
| 7,019,898 | B2 | 3/2006 | Page |
| 7,331,858 | B2 | 2/2008 | McComb |
| 7,510,476 | B2 | 3/2009 | Kobayashi |
| 7,514,132 | B2 | 4/2009 | Aida |
| 8,216,051 | B2 | 7/2012 | Rasmussen |
| 8,485,881 | B2 | 7/2013 | Griswold |
| 8,552,883 | B1 | 10/2013 | Su |
| 8,956,216 | B1 | 2/2015 | Lesourd |

(Continued)

OTHER PUBLICATIONS

U.S. Appl. No. 16/213,830, filed Dec. 7, 2018, Winston.

(Continued)

*Primary Examiner* — Adetokunbo O Torimiro
(74) *Attorney, Agent, or Firm* — Weaver Austin Villeneuve & Sampson LLP

(57) ABSTRACT

Gaming systems, methods, and machines provided herein may include wheel displays with movable wheel segments that may be caused to have at least portions thereof that at least translate along axes parallel to a center axis of the wheel display when the wheel is in a "spin" mode.

20 Claims, 23 Drawing Sheets

(56) References Cited

U.S. PATENT DOCUMENTS

| | | | |
|---|---|---|---|
| 8,979,636 | B2 | 3/2015 | Brooks |
| 9,269,283 | B2 | 2/2016 | Jurewicz |
| 10,208,934 | B2 | 2/2019 | Jurewicz |
| 2003/0060271 | A1 | 3/2003 | Gilmore |
| 2007/0293293 | A1 | 12/2007 | Baerlocher |
| 2011/0235332 | A1 | 9/2011 | Cheung |

OTHER PUBLICATIONS

Office Action dated Nov. 8, 2019 for U.S. Appl. No. 16/177,248 (pp. 1-10).
Notice of Allowance dated Feb. 24, 2020 for U.S. Appl. No. 16/177,248 (pp. 1-7).
Office Action dated Apr. 24, 2020 for U.S. Appl. No. 16/213,830 (pp. 1-12).
Notice of Allowance dated Oct. 5, 2020 for U.S. Appl. No. 16/213,830 (pp. 1-5).
Office Action dated Jun. 10, 2021 for U.S. Appl. No. 16/855,975 (pp. 1-5).
Office Action (Notice of Allowance and Fees Due (PTOL-85)) dated Nov. 4, 2021 for U.S. Appl. No. 16/855,975 (pp. 1-5).

WHEEL DISPLAY WITH MOVEABLE SEGMENTS

CROSS-REFERENCE TO RELATED APPLICATIONS

This application is a continuation under 35 U.S.C. § 120 of U.S. patent application Ser. No. 16/213,830, filed Dec. 7, 2018, and titled "WHEEL DISPLAY WITH MOVEABLE SEGMENTS," which is itself a continuation-in-part under 35 U.S.C. § 120 of U.S. patent application Ser. No. 16/177,248, filed Oct. 31, 2018, and titled "ELECTRONIC GAMING MACHINE WITH DYNAMIC DISPLAY," which itself claims benefit of priority under 35 U.S.C. § 119(e) to U.S. Provisional Application No. 62/733,058, filed Sep. 18, 2018, titled "ELECTRONIC GAMING MACHINE WITH DYNAMIC DISPLAY," all of which are hereby incorporated herein by reference in their entireties and for all purposes. In particular, any suitable technology described in either of these priority applications that is applicable to providing movable display units is to be understood as being usable to provide an actuation mechanism or mechanisms suitable for the movable wheel segments discussed herein.

BACKGROUND

The field of disclosure relates generally to electronic gaming, and more particularly to systems and methods relating to play of an electronic game on a gaming machine having a dynamic display.

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Disclosed herein are various dynamic wheel displays, or simply "wheel displays," in which segments of the wheel are used to indicate various outcomes that may be selected in response to "spinning" the wheel (such "spinning" may be virtual, i.e., there may be no rotation of the wheel itself, but segments may be successively selected and deselected to give the appearance that the "selection" occurs in a rotating manner, e.g., similar to spinning a wheel relative to a fixed pointer or spinning a pointer relative to a fixed wheel). In such wheel displays, an actuation mechanism may be provided that causes the wheel segments to translate, pivot, or otherwise move in concert with such a wheel spin such that the "selected" wheel segment (s) at any given time is indicated through the relative displacement of the wheel segments (or portions thereof) in directions parallel to a center axis of the wheel display.

In some implementations, a system may be provided that includes a wheel display assembly including: a support structure, a set of first wheel segments radially arranged around a common center axis, and an actuation mechanism configured to be transitioned between a plurality of actuated configurations. In such a wheel display assembly, the first wheel segments in the set of first wheel segments may be supported, at least in part, by the support structure, the actuation mechanism may have a first portion that is fixed relative to the support structure and one or more second portions that are movable relative to the support structure to transition the actuation mechanism between the plurality of actuated configurations, the first wheel segments may each be movably connected with the support structure and may each be interfaced with a second portion of the one or more second portions of the actuation mechanism such that each of the first wheel segments is at least movable between at least two corresponding wheel segment configurations, including a first wheel segment configuration and a second wheel segment configuration, relative to the support structure in response to the actuation mechanism transitioning to a corresponding one of the actuated configurations, and transitioning of each first wheel segment between the corresponding first wheel segment configuration and the corresponding second wheel segment configuration may cause at least a first sub-portion of that first wheel segment to at least translate along a direction parallel to the center axis.

In some such implementations, the wheel display assembly may further include one or more sets of second wheel segments radially arranged around the common center axis. In such implementations, each set of second wheel segments may encircle the set of first wheel segments and N sets of second wheel segments, N may be greater than or equal to zero and may be different for each set of second wheel segments, the second wheel segments in each set of second wheel segments may be supported, at least in part, by the support structure, the second wheel segments may each be movably connected with the support structure and may each be interfaced with a second portion of the one or more second portions of the actuation mechanism such that each of the second wheel segments is at least movable between at least two corresponding wheel segment configurations, including a first wheel segment configuration and a second wheel segment configuration, relative to the support structure in response to the actuation mechanism transitioning to a corresponding one of the actuated configurations, and transitioning of each second wheel segment between the corresponding first wheel segment configuration and the corresponding second wheel segment configuration may cause at least a first sub-portion of that second wheel segment to at least translate along a direction parallel to the center axis.

In some implementations of the system, each first wheel segment may include an outer face that has a sector-shaped or annular sector-shaped appearance.

In some implementations of the system, the actuation mechanism may include a plurality of linear actuators, each first wheel segment may be connected with a different subset of one or more linear actuators of the plurality of linear actuators, and each of the subsets of one or more linear actuators may be configured to be able to be selectively actuated to cause the first wheel segment connected therewith to transition between at least the first wheel segment configuration and the second wheel segment configuration for that first wheel segment.

In some implementations of the system, each first wheel segment may be interfaced with a corresponding linear guide that constrains movement of the first wheel segment interfaced therewith to translation along a translation axis within 10° of parallel to the center axis.

In some implementations of the system, each first wheel segment may extend through a corresponding segment of arc centered on the center axis and having a wheel segment sweep angle defined by an acute angle between two radii perpendicular to the center axis and intersecting the endpoints of that corresponding segment of arc, the actuation mechanism may include a rotary cam structure configured to rotate about a rotation axis, the rotary cam structure may have an annular cam surface, the actuation mechanism may further include one or more motors configured to cause the rotary cam structure to rotate about the rotation axis responsive to one or more control signals, each first wheel segment may include a cam follower structure that is configured to contact the annular cam surface when the annular cam surface is located at a first distance from a reference plane that is a) perpendicular to the center axis and b) located such that the set of first wheel segments is interposed between the rotary cam structure and the reference plane, the annular cam surface may include one or more base regions, a plurality of flanking regions, and one or more cam nose regions, each flanking region may be circumferentially interposed between one of the one or more base regions and one of the one or more cam nose regions, each cam nose region may be located closer to the reference plane than the one or more base regions adjoining the two flanking regions between which that cam nose region is interposed, each cam nose region may extend through a corresponding segment of arc centered on the rotation axis and having a cam nose region sweep angle defined by an acute angle between two radii perpendicular to the rotation axis and intersecting the endpoints of that corresponding segment of arc, and the cam nose region sweep angle may be less than a smallest wheel segment sweep angle of the wheel segment sweep angles.

In some such implementations of the system, the actuation mechanism may further include a linear actuator configured to translate the rotary cam structure along the center axis between at least a first position and a second position, the annular cam surface may be located at the first distance from the reference plane when the rotary cam structure is in the first position, the annular cam surface may be located at a second distance from the reference plane when the rotary cam structure is in the second position, the second distance may be greater than the first distance, and when the rotary cam structure is in the second position, none of the cam follower structures may contact the base regions.

In some additional or alternative such implementations, the rotary cam structure may further include at least one pointer indicator that is aligned with at least one of the one or more cam nose regions.

In some implementations, each first wheel segment may be connected with the support structure by a corresponding rotational joint having a rotation axis that is perpendicular to a corresponding radial axis that intersects with and is perpendicular to the center axis, and the rotation axes of the rotational joints may each be parallel to a plane that is perpendicular to the center axis.

In some implementations, each first wheel segment may extend through a corresponding segment of arc centered on the center axis and having a wheel segment sweep angle defined by an acute angle between two radii perpendicular to the center axis and intersecting the endpoints of that corresponding segment of arc, the actuation mechanism may include a rotary cam structure configured to rotate about a rotation axis, the rotary cam structure may have an annular cam surface, the actuation mechanism may further include one or more motors configured to cause the rotary cam structure to rotate about the rotation axis responsive to one or more control signals, each first wheel segment may include a cam follower structure that overlaps the annular cam surface when viewed along the rotation axis and that may be configured to contact the annular cam surface when the annular cam surface is located at a first distance from a reference plane that is a) perpendicular to the center axis and that is b) located such that the set of first wheel segments is interposed between the rotary cam structure and the reference plane, the annular cam surface may include one or more base regions, a plurality of flanking regions, and one or more cam nose regions, each flanking region may be circumferentially interposed between one of the one or more base regions and one of the one or more cam nose regions, each cam nose region may be located closer to the reference plane than the one or more base regions adjoining the two flanking regions between which that cam nose region is interposed, each cam nose region may extend through a corresponding segment of arc centered on the rotation axis and having a cam nose region sweep angle defined by an acute angle between two radii perpendicular to the rotation axis and intersecting the endpoints of that corresponding segment of arc, and the cam nose region sweep angle may be less than a smallest wheel segment sweep angle of the wheel segment sweep angles.

In some such implementations, the actuation mechanism may further include a linear actuator configure to translate the rotary cam structure along the center axis between at least a first position and a second position, the annular cam surface may be located at the first distance from the reference plane when the rotary cam structure is in the first position, the annular cam surface may be located at a second distance from the reference plane when the rotary cam structure is in the second position, the second distance may be greater than the first distance, and none of the cam follower structures may contact the base regions when the rotary cam structure is in the second position.

In some implementations, each first wheel segment may include an outer surface that has a sector-shaped or annular sector-shaped appearance when viewed along the center axis. In some implementations, each first wheel segment may include an outer surface that includes a first display panel with a first display surface.

In some such implementations, each of the first wheel segments may be circumferentially interposed between two adjacent first wheel segments of the set of first wheel segments, each first wheel segment may include a first side portion and a second side portion, the first side portion may include a second display panel with a second display surface, the second side portion may include a third display panel with a third display surface, and the second and third display surfaces of each corresponding first wheel segment may each face towards a different one of the two first wheel segments adjacent to the corresponding first wheel segment at least when the corresponding first wheel segment and the first wheel segments adjacent thereto are all in the corresponding first wheel segment configurations.

In some implementations, each first wheel segment may include an outer surface that includes a first illumination device. In some such implementations, each of the first wheel segments may be circumferentially interposed between two adjacent first wheel segments of the set of first wheel segments, each first wheel segment may include a first side portion and a second side portion, the first side portion may include a second surface including a second illumination device, the second side portion may include a third surface including a third illumination device, and the second and third surfaces of each corresponding first wheel segment may each face towards a different one of the two first wheel segments adjacent to the corresponding first wheel segment at least when the corresponding first wheel segment and the first wheel segments adjacent thereto are all in the corresponding first wheel segment configurations.

In some implementations, each first wheel segment may include an outer surface that includes an illumination device.

In some implementations, the systems discussed above may further include a housing, one or more display units, and a game controller that includes one or more processors and one or more memory devices. In such implementations, the wheel display assembly may be supported by the housing, the one or more processors, the one or more memory devices, the one or more display units, and the wheel display assembly may be operably connected, and the one or more memory devices may store computer-executable instructions for controlling the one or more processors to: present a wagering game on the one or more display units, determine that a bonus event condition has been met, and cause, responsive at least in part to determining that the bonus event condition has been met, the actuation mechanism actuate to cause one or more of the first wheel segments to move.

These and other implementations will be evident from the discussion below, and the disclosure is not limited to the above-listed specific implementations.

BRIEF DESCRIPTION OF THE DRAWINGS

FIGS. 1 through 23 are intended to be illustrative only and should not be viewed as limiting this disclosure to only the depicted implementations. It is to be understood that the concepts discussed herein may be implemented in a vast number of different ways while still embodying the ideas discussed herein, and it is to be understood that this disclosure covers such alternative implementations.

DETAILED DESCRIPTION

Figure 1:
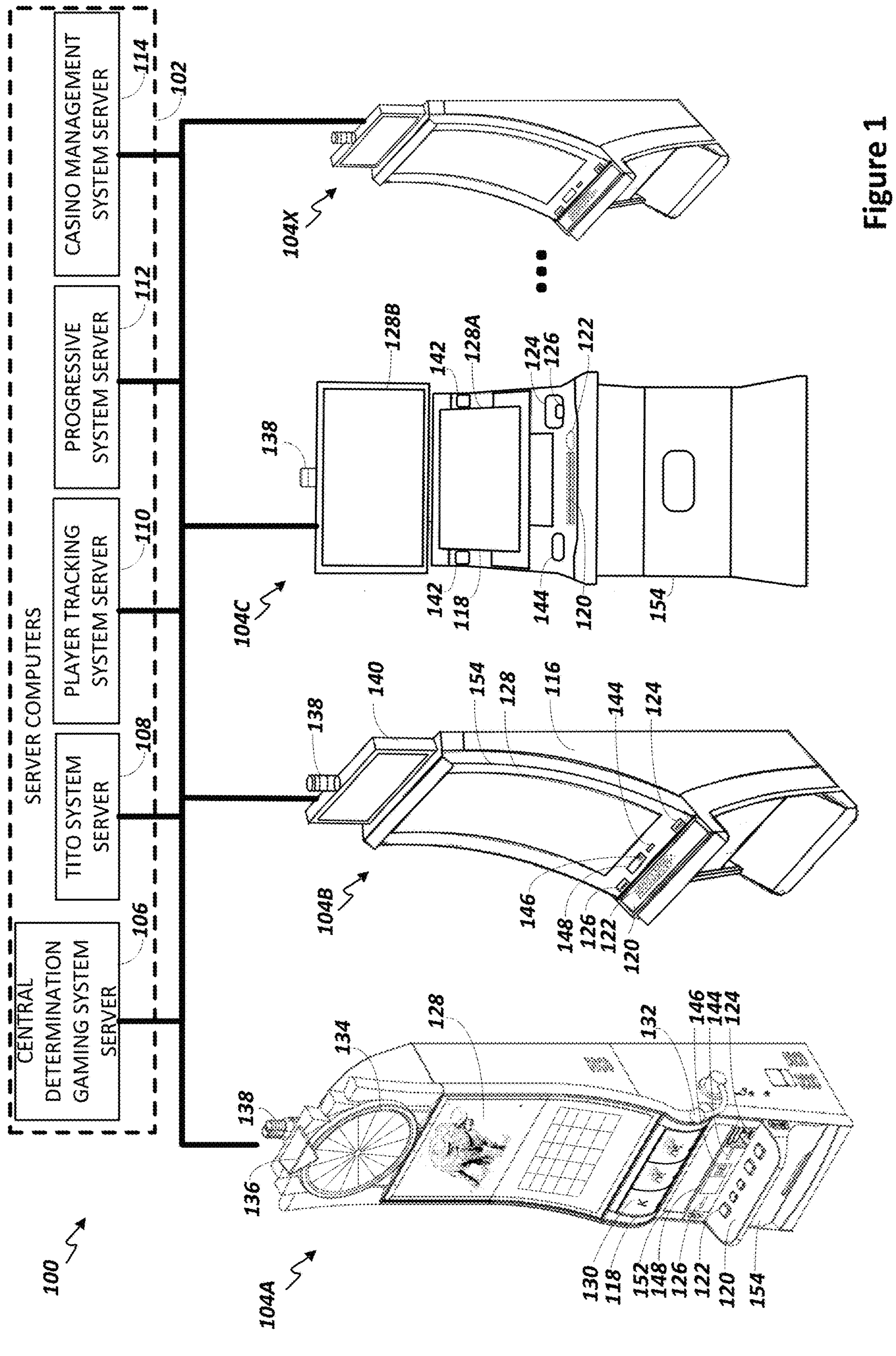
FIG. 1 is an exemplary diagram showing several EGMs networked with various gaming-related servers.

The present disclosure is directed at wheel displays with movable segments for use in electronic gaming machines, related equipment, or, more broadly, in any device or system in which wheel-type displays may be used.

In a typical wheel display, a circular or non-circular area may be divided up into sector-like segments by a plurality of lines radiating out from a common center point, e.g., like spokes of a wheel. Each of the segments, which may be referred to as "wheel segments" or the like, is typically associated with a particular outcome, with there being at least two wheel segments of the wheel segments that are associated with two different outcomes. In many cases, there may be many different outcomes associated with the wheel segments of a wheel display, although it is often the case that there will be a small number, e.g., one or two, wheel segments that may be associated with outcomes of significantly higher value than the outcomes associated with other wheel segments in the wheel display. During use, a wheel display will typically cause the wheel segments to be sequentially selected in some manner before presenting a final selection of a wheel segment that is, by virtue of being the final selection, deemed the "winning" or "selected" outcome. For example, in some wheel displays, the wheel area that is divided up into sectors may be physically rotated about the center point of the wheel such that each wheel segment moves past a stationary pointer indicator located at the periphery of the wheel area in a sequential manner; once the wheel area slows down and stops, the wheel segment indicated by the pointer indicator would be considered to be the selected outcome. In other wheel displays, the wheel area may remain stationary and a pointer indicator may be caused to rotate about the center point so as to sequentially traverse through the wheel segments; when the pointer indicator stops moving, the indicated wheel segment may be considered to be the selected outcome. In yet further wheel displays, both the pointer indicator and the wheel area may rotate relative to each other and to a world coordinate frame; when both the wheel area and the pointer indicator stop rotating, the indicated wheel segment may be considered to be the selected outcome. Some wheel displays may feature multiple pointer indicators that allow multiple wheel segment selections to be made, or for a player to choose between multiple possible outcomes (either before or after the activation of the wheel display).

In the wheel displays discussed herein, the wheel segments may be caused to move such that at least a portion of each wheel segment at least translates along an axis parallel to the axis of rotation of the wheel display (either the axis of rotation of the wheel area or of the pointer indicator). In many implementations, such translation may be coordinated or synchronized with the relative movement between the pointer indicator and the wheel segments and may serve to highlight which wheel segment is currently indicated by the pointer indicator. In some implementations of the wheel displays discussed herein, however, the translation may be driven independently of the relative movement between the pointer indicator and the wheel segments. Discussion of such wheel displays will be explored in more depth following the discussion of example gaming machines and systems set forth below, which may be representative of gaming machines and systems that may incorporate such wheel displays.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game. The bonus topper wheel, for example, may be a wheel display with movable segments as discussed later herein.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
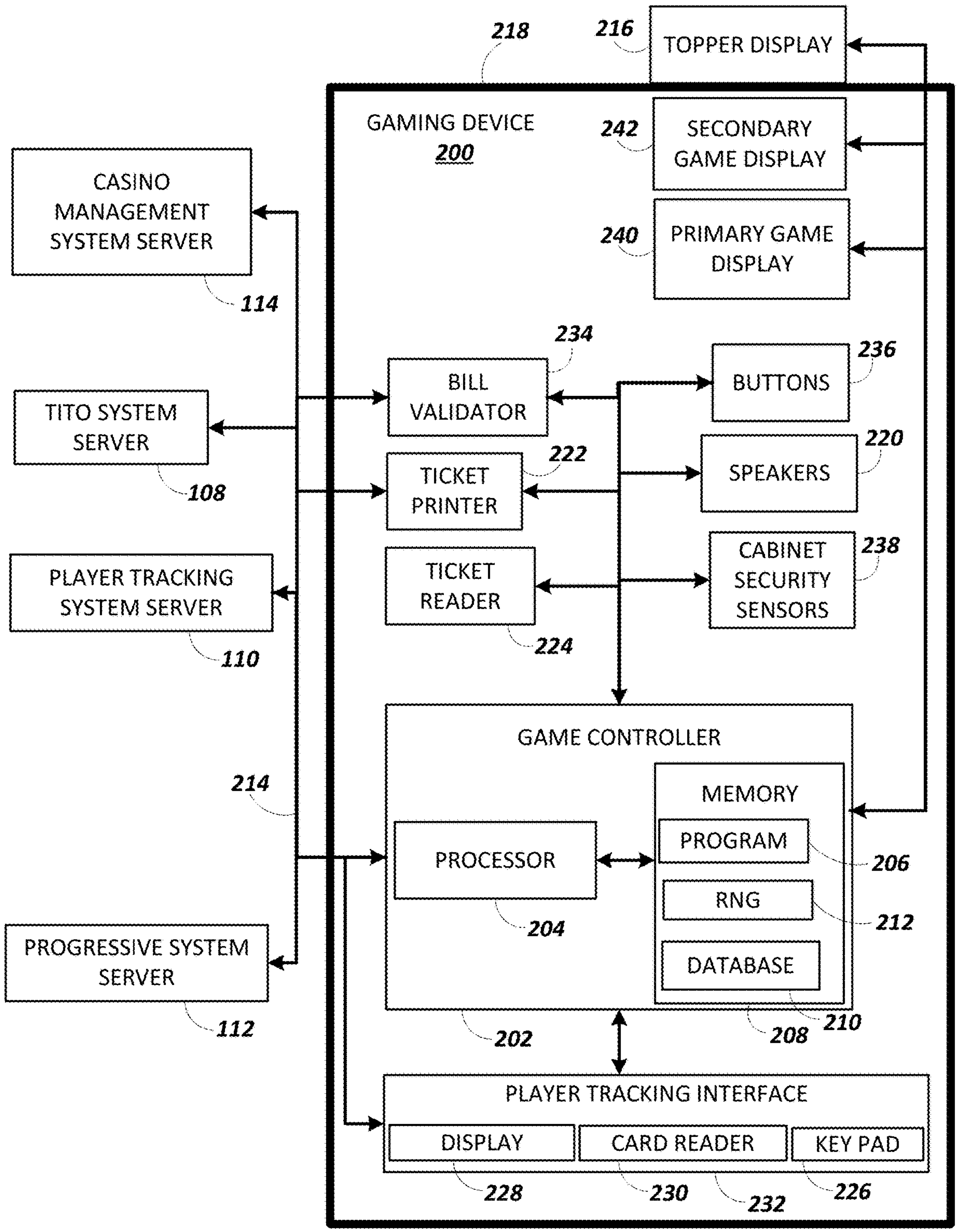
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
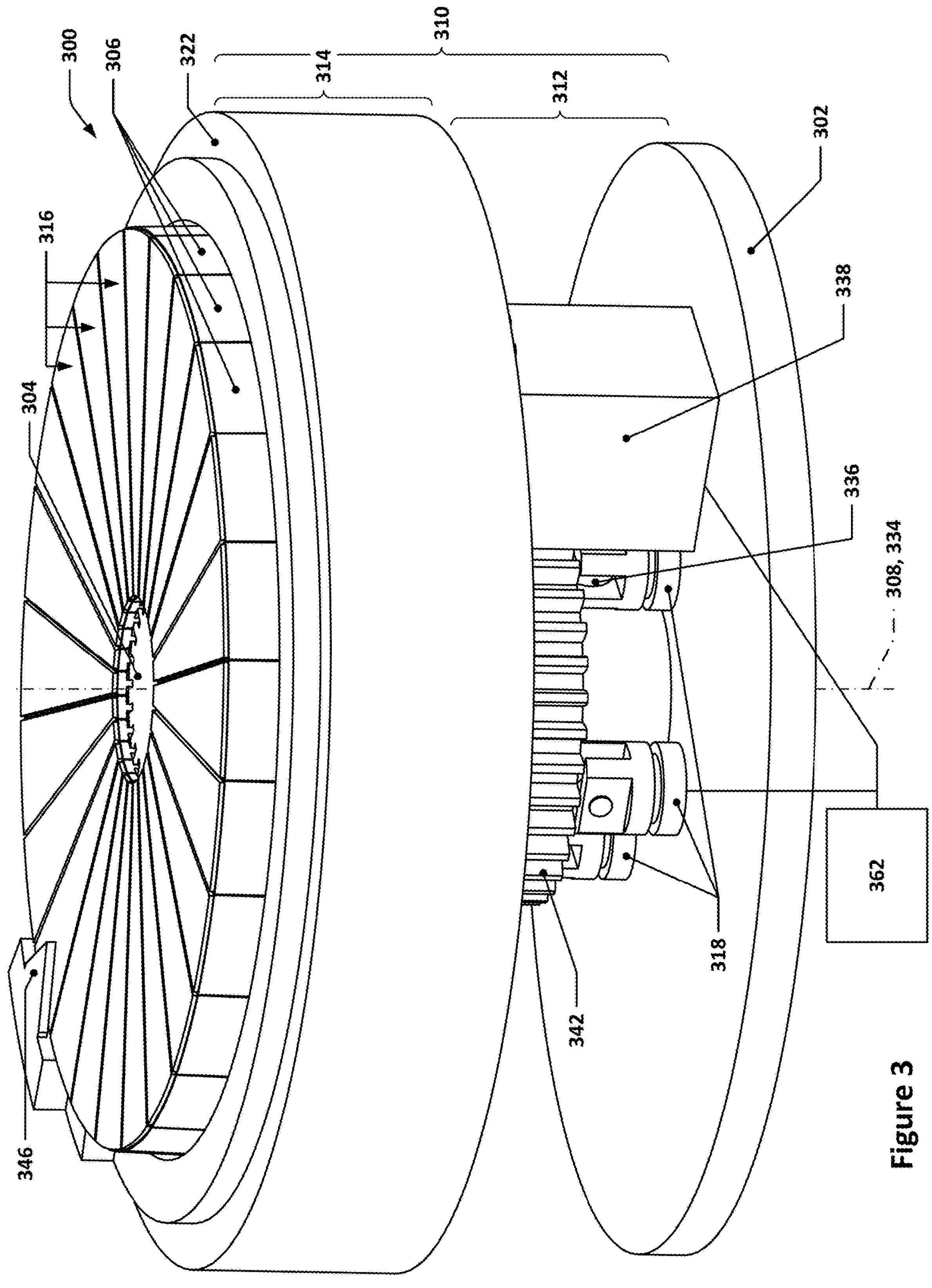
FIG. 3 depicts an example wheel display with movable wheel segments.

FIG. 3 depicts an example wheel display with movable wheel segments. In FIG. 3, a wheel display 300 is shown that includes a plurality of wheel segments 306 that are arranged in a radial or circular array about a hub 304 and a common center axis 308. An actuation mechanism 310 may be provided to cause translation of at least portions of the wheel segments 306 at least along directions parallel to the common center axis 308. The actuation mechanism may include a first portion 312 and a second portion 314; the second portion 314 may be configured to be movable (or have elements that are independently movable) relative to the first portion 312. In this example, the first portion 312 includes a stationary base or support structure 302 that may be affixed or mounted to a gaming machine or other device, as well as a motor 338, a plurality of linear actuators 318 each terminating in a roller 336, and a pinion gear 340 (see FIG. 4). The actuation mechanism 310 may be transitioned between a plurality of actuated configurations, each of which may cause a different wheel segment displacement or combination of wheel segment displacements to occur.

The second portion 314 in this example includes, for example, a rotary cam structure 322 and a ring gear 342. Additionally, a pointer indicator 346 is connected with the rotary cam structure 322 such that when the rotary cam structure 322 is rotated about the common center axis 308 (which may also serve as rotation axis 334 in this example), the pointer indicator 346 rotates with it.

The wheel segments 306 in this example are all equally sized, e.g., extend through the same angular distance around the common center axis 308, although other implementations may utilize wheel segments 306 that differ in size. In most implementations, the number of wheel segments 306 will be sufficient to form a complete circle or ring about the center of the wheel display (regardless of whether they are equal-sized or of two or more different sizes), but in some implementations, the wheel segments 306 may not form a circle or ring and may have one or more gaps, e.g., a 90° sector, in between two or more of the wheel segments that is filled with unmovable structure. The wheel segments 306 may have various information displayed on them to inform a person viewing the wheel display 300 as to what the potential outcomes are for the wheel segments. Such outcomes may include, for example, credit values, credit multipliers, wild symbols, free spins, etc. Such information may, for example, be presented through fixed graphical or textual content (not shown in the Figures), e.g., content that has been painted, silkscreened, engraved, or otherwise permanently or semi-permanently affixed to each wheel segment.

For example, each wheel segment 306 may include text indicating a dollar or credit amount that may be won if that wheel segment 306 is selected at the end of a wheel "spin." In some instances, a wheel segment 306 may include an indication other than a credit amount, e.g., a "jackpot" or "bonus game" indicator, which may indicate the award of a jackpot (which may be of a variable amount) or the opportunity to play a bonus game for additional credit-earning opportunities. Alternatively, and as shown in FIG. 3, each wheel segment 306 may include a display panel, e.g., an LCD, LED, OLED, micro-LED, or other type of pixelated display device, that has a display surface that provides an outer face 316 (which may be sector-shaped or have an annular sector shape; a "sector" generally refers to a segment of a circle bounded by two radii of the circle (a "pie" or "wedge" shape) and an "annular sector" refers to the equivalent shape for an annulus or ring, although it will be understood that the term "sector-shaped," as used herein, may refer to any sub-portion of a larger shape that is bounded by two lines radiating out from a general center point of the larger shape—for example, a wheel display may have a square area instead of a circular area, and a sector shape of the square area may be a triangle or quadrilateral defined by the outer edge or edges of the square and two lines radiating out to that edge or edges from a common point within the square) of the wheel segment 306 and that may be configured to display graphical content in response to instructions received from a controller. In such implementations, the graphical content may be changed, e.g., the outcomes for each wheel segment 306 may be changed to other values or outcomes in between wheel spins or may be animated to provide for additional player enjoyment. It should also be understood that the hubs in the centers of the wheel displays discussed herein may also be equipped with one or more display panels (they may be flat instead of having a conical shape, as shown in various Figures herein, although flexible display panels may be applied to hubs with conical exterior surfaces as well) that may be controlled to allow the graphics shown in the center hub to be changed during play.

In some implementations, regardless of whether the outer faces 316 have display panels or static graphics, the wheel segments 306 may also include backlights or other illumination devices that are located within the wheel segments and that may be controllable to illuminate the static graphics or display panels from behind. In implementations with static graphics, the static graphics may be printed, e.g., silkscreened, onto transparent or translucent panels and the wheel segments 306 may be equipped with grooved channels or L-bracket channels that may receive the panels and retain them in place, but which also allow the panels to be easily slid out of the wheel segments and replaced with new panels having, for example, different graphics and/or awards. In some implementations, the wheel segments may have panels that are adhered to the outer faces 316 by adhesives, e.g., double-sided adhesive tape.

The wheel display 300 may be controlled by a controller 362 that may be operably connected with the motor 338, the linear actuators 318 (if used), and various other components used to provide wheel display functionality, for example, display components such as display panels, lighting devices, etc. The controller 362 may include one or more processors and one or more memory devices storing computer-executable instructions thereon for controlling the one or more processors to cause the components of the wheel display 300 to perform various actions, such as, for example, causing relative rotation between the rotary cam structure 322 and the wheel segments 306 (in this example and the next) or causing the linear actuators for individual wheel segments to actuate (see the example discussed later with respect to FIGS. 15 through 17). The controller 362, it will be recognized, may be a discrete controller from the game controller or may be integral to the game controller of an electronic gaming machine.

Figure 4:
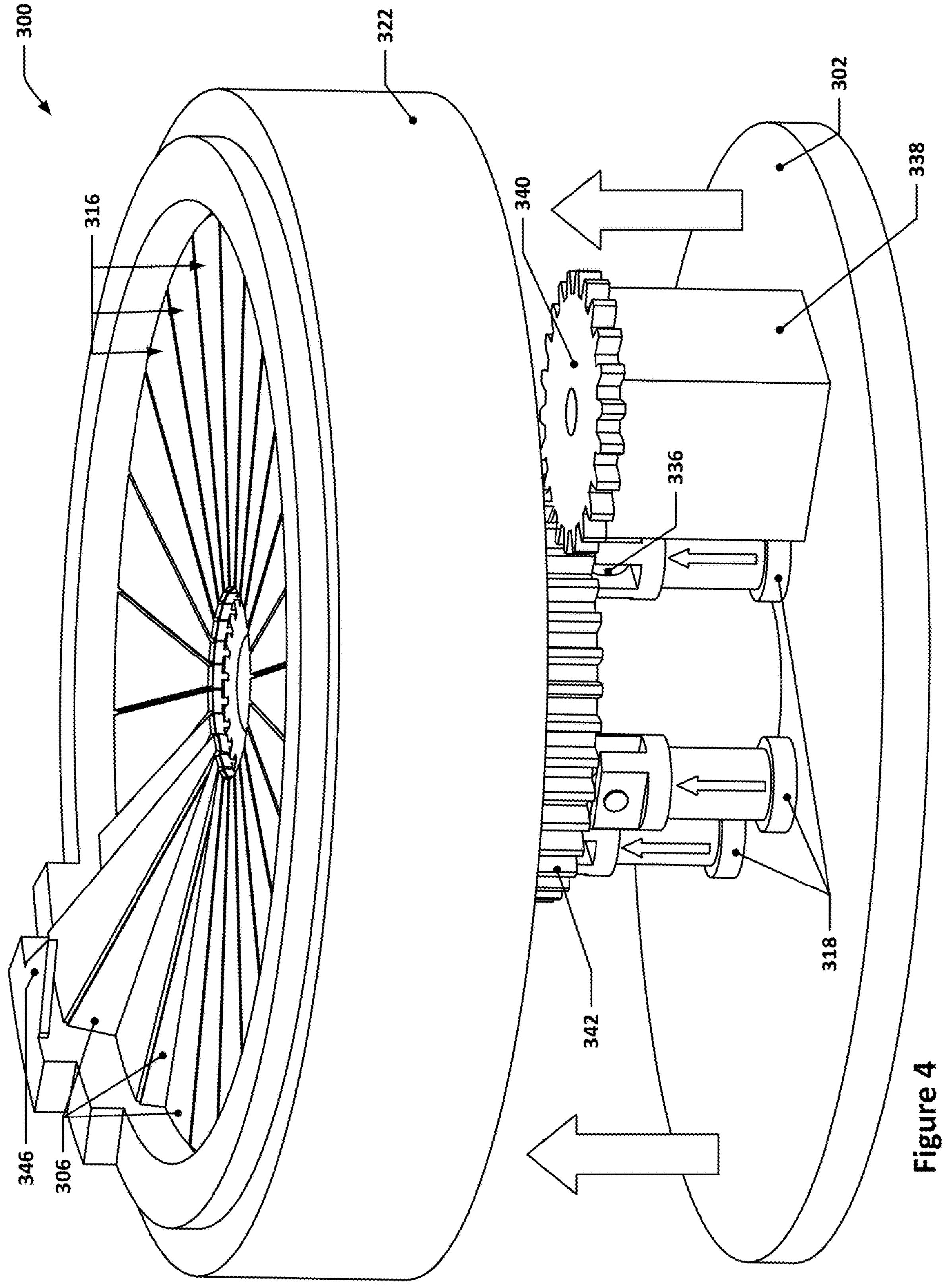
FIG. 4 depicts the example wheel display of FIG. 3 in an actuated configuration.

FIG. 4 depicts the wheel display of FIG. 3, but with the second portion 314 (and rotary cam structure 322) actuated by the linear actuators 318 so as to be pushed upwards relative to the first portion 312. As will become apparent from FIG. 5, which depicts an exploded view of the wheel display 300 of FIGS. 3 and 4, such vertical translation of the rotary cam structure 322 may cause an annular cam surface 324 in the rotary cam structure 322 to come into contact with cam follower structures 344, thus providing an interface between each wheel segment 306 and the actuation mechanism 310. Each cam follower structure 344 may be connected with a respective wheel segment 306 which may, in turn, be supported by the first portion 312, e.g., by being pivotally connected with the hub 304 by a hinge or other similar mechanism such that a force exerted on the cam follower structure 344 and having a force component aligned with the common center axis 308 may cause the associated wheel segment 306 to pivot relative to the hub 304. Such pivoting of the wheel segments 306 is evident in FIG. 4 for the three wheel segments 306 that are adjacent/proximate to the pointer indicator 346.

Figure 6:
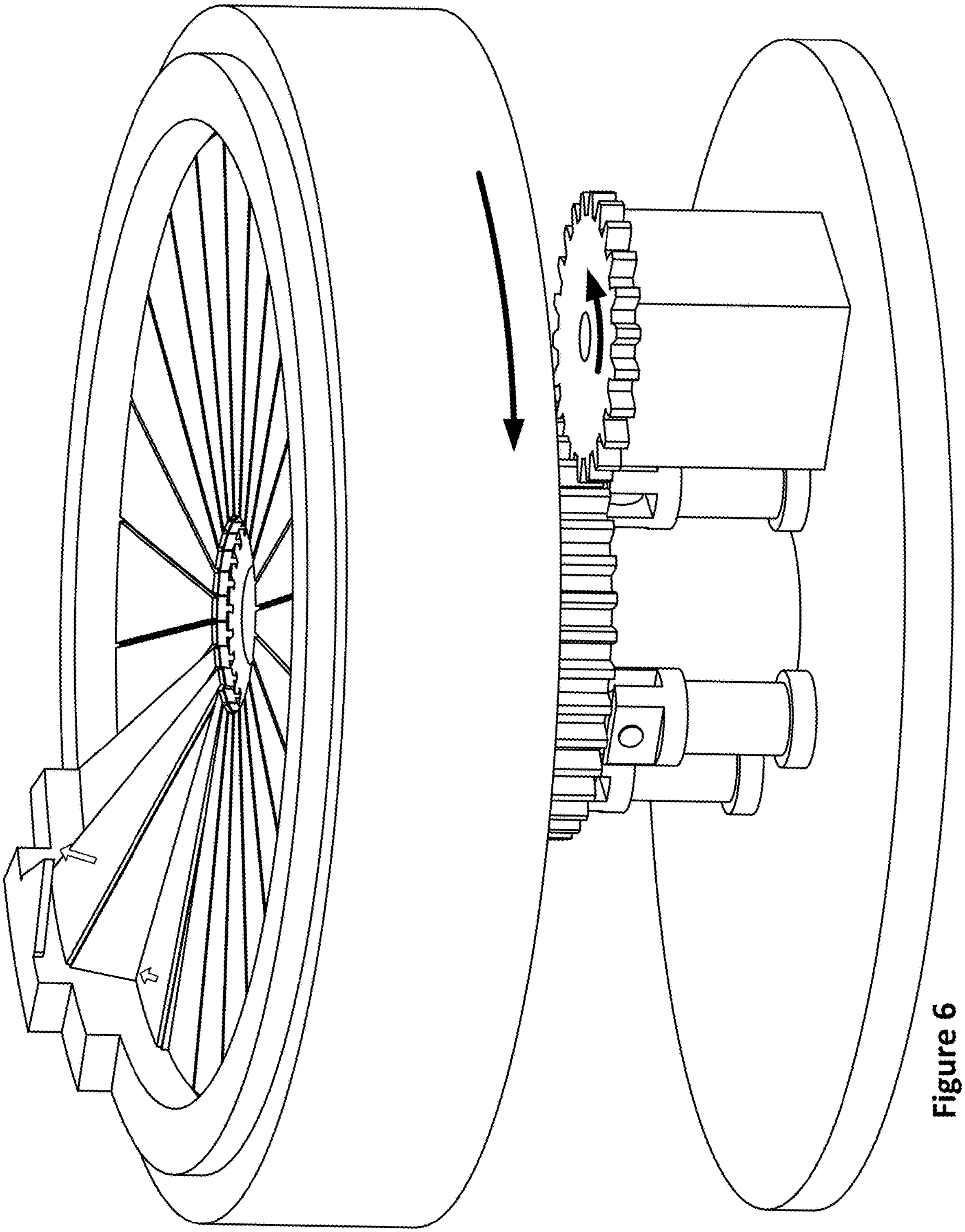
FIGS. 6 through 8 depict the example wheel display of FIG. 3 in various states of actuation.
Figure 7:
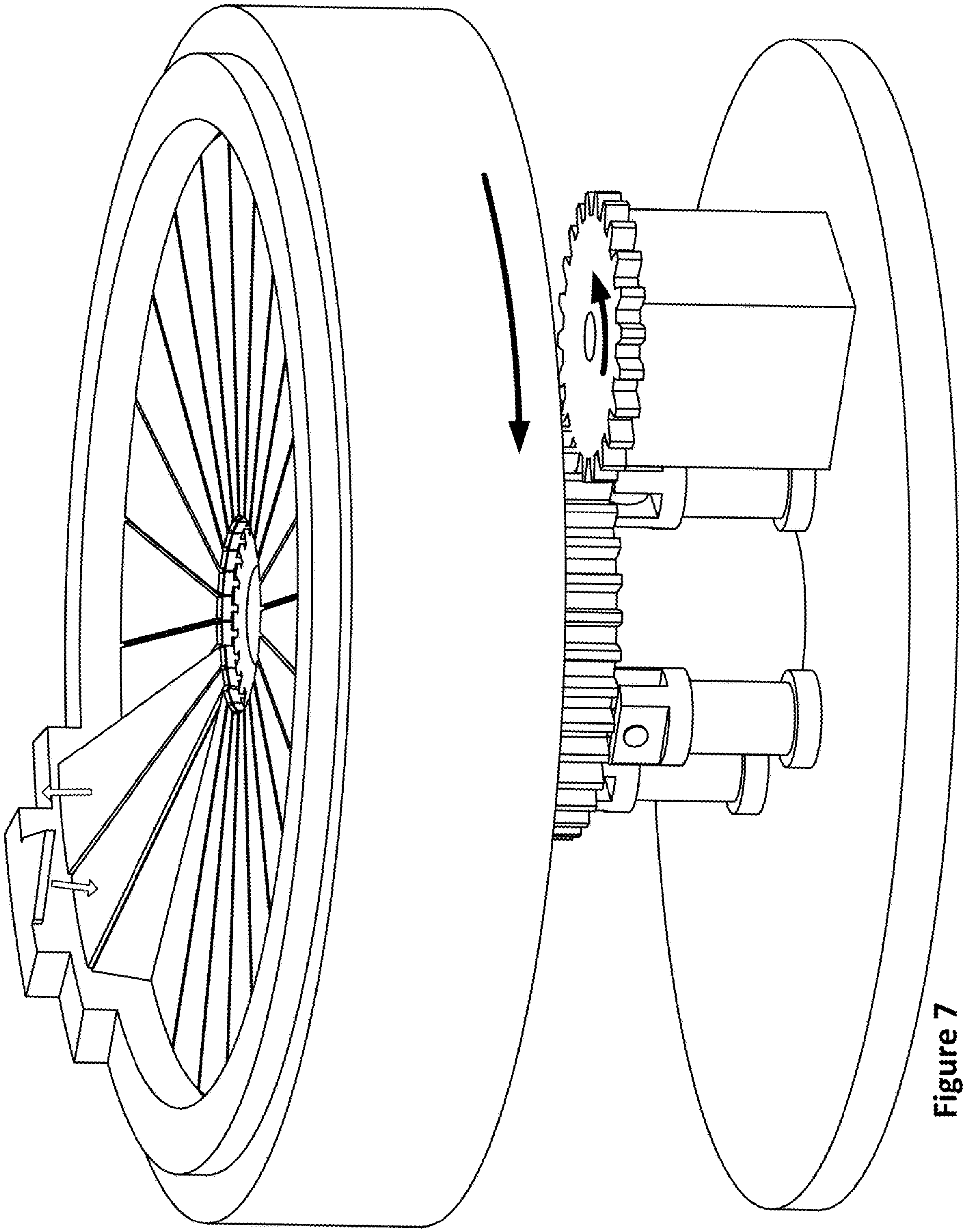
Figure 8:
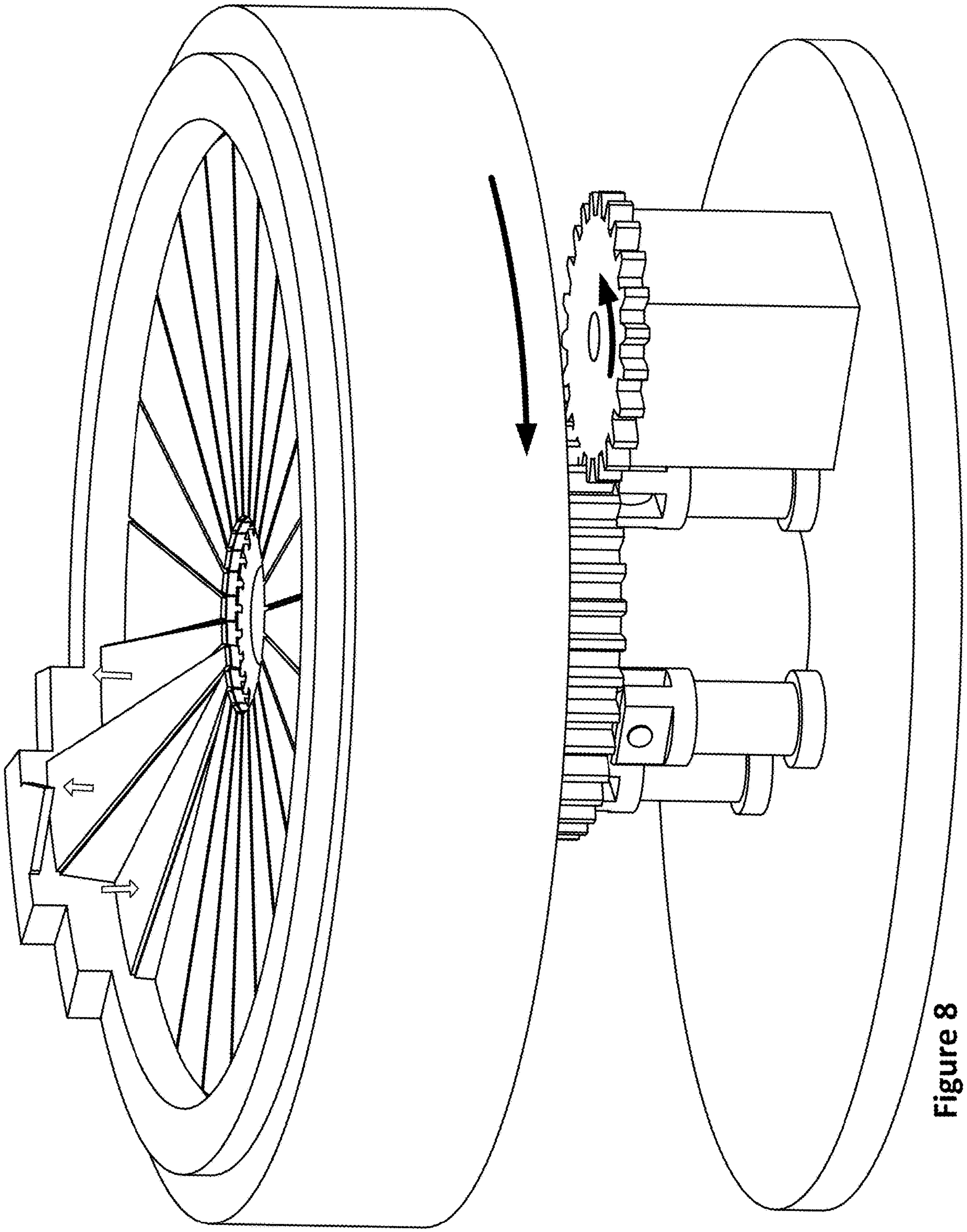

When the cam follower structures 344 are in contact with the annular cam surface 324, the annular cam surface 324 may cause the cam follower structures 344 to move up and down (or in and out, depending on how one views the wheel display) as the annular cam surface 324 rotates about the rotation axis 334 (or, alternatively, as the wheel segments 306 rotate about the rotation axis 334 relative to the annular cam surface 324). This, in turn, may cause the wheel segments 306 associated with the displaced cam follower structures 344 to pivot relative to the hub 304, which may generate a circular wave effect in the wheel segments, as is illustrated in FIGS. 6 through 8, which show such an effect for a small amount of relative rotation between the rotary cam structure 322 and wheel segments 306. This "wave" effect can travel circumferentially about the wheel display multiple times before being "slowed" down to cause the selected wheel segment 306 to be displaced to a greater extent than the other wheel segments 306 to indicate the desired outcome.

Generally speaking, the actuation mechanism 310 (and other actuation mechanisms discussed herein) may be actuated to cause the wheel segments 306 to transition or move between at least two wheel segment configurations; each wheel segment configuration for a wheel segment may correspond with a different relative positioning of that wheel segment relative to, for example, the support structure 302 and with a different actuated configuration of the actuation mechanism 310.

In the implementation shown, the rotary cam structure 322 and the annular cam surface 324 are configured to be able to be displaced along the common center axis 308 such that the cam follower structures 344 may be disengaged from the annular cam surface 324. Put another way, the annular cam surface 324 may be configured to as to be positioned at a first distance away from a reference plane that is perpendicular to the common center axis 308 and located such that the wheel segments 306 are interposed between the reference plane and the rotary cam structure. At the first distance, the annular cam surface 324 may be engaged with the cam follower structures 344. In implementations where the annular cam surface is movable along the common center axis 308 relative to the wheel segments, the annular cam surface 324 may be movable to be at a second distance from the reference plane that is greater than the first distance and that causes the cam follower structures 344 to disengage from the annular cam surface 324.

In instances where the annular cam surface 324 may be disengaged from the cam follower structures 344, the hub 304 (or other structure) may be equipped with a segment support 352, e.g., an annular shelf or other support structure, that may contact the wheel segments 306 from below after the wheel segments 306 pivot downwards by an amount sufficient to cause the wheel segments 306 to come into contact therewith. Thus, as the annular cam surface 324 is moved closer to the first portion 312, the wheel segments 306 may pivot “downwards” (or closer to the first portion 312) until they contact the segment support 352, at which point the wheel segments 306 may no longer contact the annular cam surface 324 and for the remainder of the displacement of the annular cam surface 324. Through such translation of the annular cam surface 324, the effects of any cam lobes, e.g., raised portions, of the annular cam surface on the wheel segments 306 may be removed. This may have a beneficial effect in that the wheel display 300 may look like any other wheel display, e.g., with a “flat” or uniform field of wheel segments, until the annular cam surface 324 is brought into contact with all of the cam follower structures 344, at which point one or more of the wheel segments 306 may be caused to rise up, as shown in FIG. 4, to provide a 3D effect. Such an effect may be provided, for example, just prior to a wheel spin, which may provide for an exciting visual effect that may stimulate player interest and engagement. Alternatively, such an effect may be initiated after the wheel spin has begun so that the initial wheel spin appears to be of a flat wheel which later develops into a wheel spin with a 3D element or aspect to it. In some implementations of wheel displays having the ability to transition from a “flat” appearance, i.e., where all of the wheel segments are at the same relative height, to a “displaced” appearance, i.e., where one or more of the wheel segments are displaced relative to the other wheel segments, the wheel displays may be controlled so as to transition between the “flat” and “displaced” states repeatedly, thereby causing the displaced wheel segments to “pulse” outward and inward relative to the remainder of the wheel segments. Such an effect may be used, for example, after a wheel spin has completed and a selected outcome has been indicated by the wheel segment that is displaced the furthest along the center axis of the wheel display; in such a scenario, the “pulsing” behavior may serve to emphasize the selected outcome, thereby enhancing the visual experience of achieving the outcome.

It will be further understood that in some implementations, the pointer indicator(s) may be independently movable in a direction parallel to the common center axis, e.g., such as through the actuation of a linear actuator or other mechanism that causes the pointer indicator to move in and out relative to the wheel segments. In such implementations, such “pulsing” movement of the pointer indicator may act to emphasize the selected outcome of the wheel display, similar in nature, for example, to the “pulsing” of wheel segments to indicate the selected wheel segment.

In yet other implementations, the cam follower structures 344 may always be in contact with the annular cam surface 324, i.e., the annular cam surface 324 may not be displaceable relative to the hub 304 at all and one or more wheel segments 306 may always be in a displaced condition at any given time due to their constant engagement with the annular cam surface 324.

Figure 5:
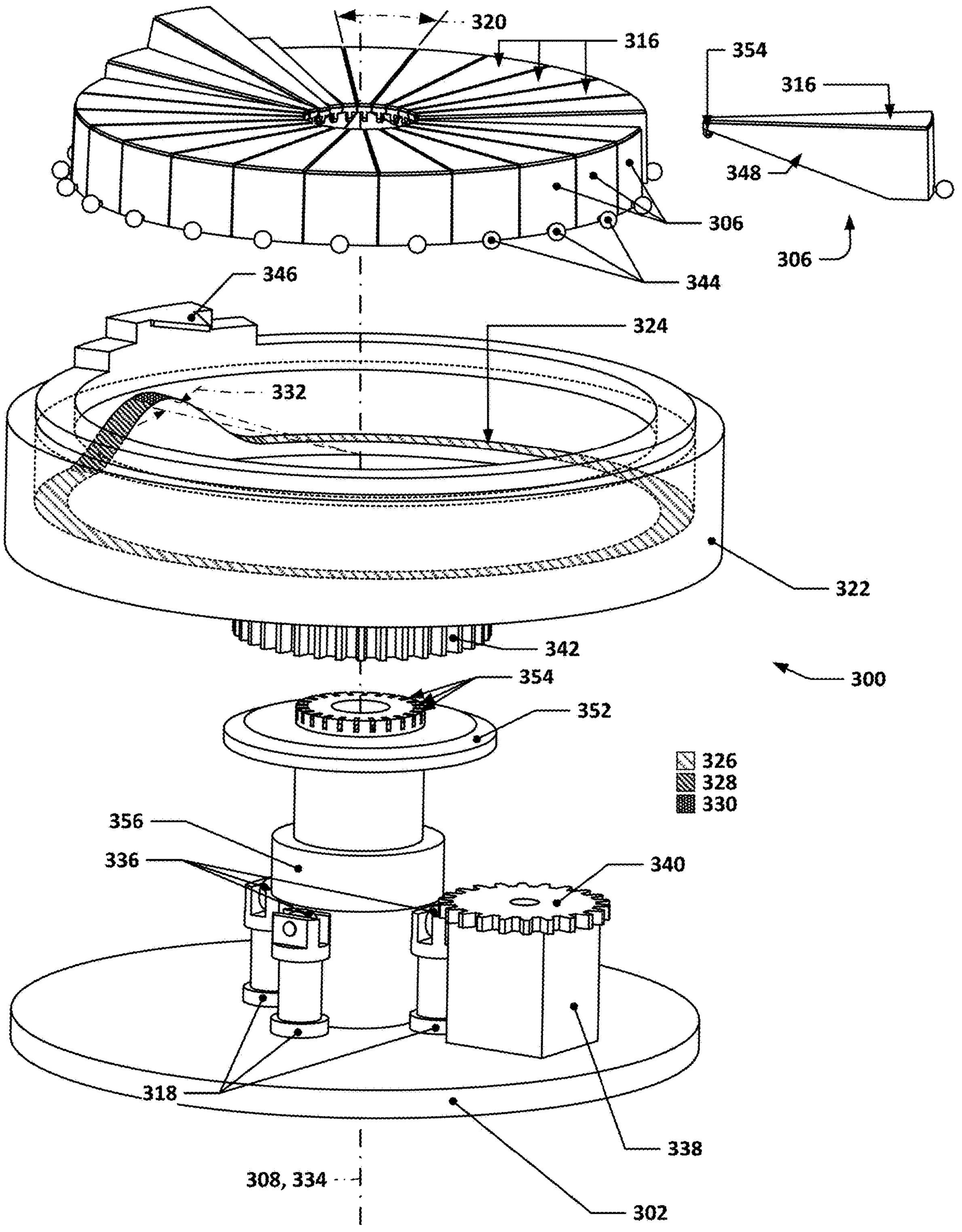
FIG. 5 depicts an exploded view of the example wheel display of FIG. 3.

Much of this structure is not apparent from FIGS. 3 and 4, but is more apparent in FIG. 5, which is an exploded view that affords more insight as to features that would ordinarily be hidden from view of the spectator. Chief among these hidden features is the annular cam surface 324, which may be a generally annular surface that may encircle the rotation axis 334. In the example shown, the annular cam surface 324 includes a base region 326 that forms the vast majority of the annular cam surface 324 and that is generally normal to the rotation axis 334. A cam nose or cam lobe is provided in the annular cam surface 324 that includes cam nose region 330 (the top-most portion of the cam nose, i.e., the portion that is furthest from the base region 326 along the rotation axis 334) and flanking regions 328 on either side of the cam nose region 330, i.e., each flanking region 328 is circumferentially interposed between the base region 326 or a base region 326 and the cam nose region 330 or a cam nose region 330, and each cam nose region 330 is circumferentially interposed between two flanking regions 328. The flanking regions 328 may be sloped and/or curved so as to provide a smooth transition between the base region 326 and the cam nose region 330. The cam nose region may extend through a cam nose region sweep angle 332, e.g., be encompassed within a sector-shaped area having an included angle of the cam nose region sweep angle 332.

In a typical wheel display of the sort depicted in FIGS. 3 through 5, the annular cam surface 324 includes only one cam nose or cam lobe, although other implementations may include multiple cam noses or cam lobes, either on the same annular cam surface or, more likely, on different annular cam surfaces. For example, there may be two annular cam surfaces 324 provided which may be concentric with, and adjacent to, one another such that the cam follower structures 344 can generally simultaneously contact both annular cam surfaces 324 and be caused to move up and down or in and out by the cam noses or cam lobes of either annular cam surface 324 (when lifted or displaced by a cam nose, a cam follower structure 344 may temporarily lose contact with the annular cam surface 324 of the rotary cam structure that is not the source of the displacement). This may allow for one wheel display 300 to support two different pointer indicators 346 (each associated with a different cam nose or cam lobe) to provide two different outcomes based on one wheel display. In other similar implementations, there may be two (or more) independently driven rotary cam structures that may be driven simultaneously to produce two or more displacement effects of wheel segments which may periodically overlap one another and which may only indicate a “selected” outcome when the wheel display stops movement of the rotary cam structures 322 such that the same wheel segment 306 is displaced by each rotary cam structure 322.

Generally speaking, in many implementations, the cam nose region sweep angle 332 may be constrained somewhat by the sweep angle 320 of the wheel segments 306. The sweep angle 320 may represent the angular sweep of a segment of arc that is centered on the common center axis 308 and bounded between two radii extending outwards from the common center axis 308 and bounds the wheel segment 1506. For example, the cam nose region sweep angle 332 may generally be less than the smallest sweep angle 320 of the wheel segments 306 to avoid scenarios where two adjacent wheel segments are both at the displacement amount and also the wheel segments 306 with the most displacement, which may make it difficult to determine which wheel segment 306 is the "selected" wheel segment 306 if the wheel display 300 stops in such a configuration.

Also visible in FIG. 5 is bearing 356, which may rotatably support the rotary cam structure 322 relative to the hub 304 and/or support structure 302, which may form part of the first portion 312 of the actuation mechanism 310. The hub 304 may also include a plurality of rotational joints 354, e.g., pins and corresponding holes on the ends of the wheel segments, that may be used to connect and rotatably support the wheel segments 306 relative to the hub 304.

As can be seen, each wheel segment 306 may have side portions, e.g., first side portion 348 and a second side portion (not shown) on the opposite side of the wheel segment 306. The first side portions 348 and the second side portions may, in some implementations, have some portions thereof that extend to a depth that is at least equivalent to the maximum difference in height between the cam nose region 330 and the base region 326 such that when a single wheel segment 306 is at maximum displacement relative to the neighboring wheel segments 306, the first side portions 348 and the second side portions act to obscure or hide the internal workings of the wheel display 300. In implementations where the wheel segments 306 adjacent to a fully displaced wheel segment 306 are also somewhat displaced, e.g., due to having cam follower structures 344 that are contacting the flanking regions 328, the side portions may extend to a lesser depth, e.g., ~50% of the maximum difference in height between the cam nose region 330 and the base region 326, to achieve a similar effect.

In some implementations of wheel displays having side portions on each wheel segment 306, the side portions may include display panels or illumination devices. For example, the side portions of each wheel segment 306 may each include an electroluminescent light panel or other illumination device to allow the wheel segments 306 to emit a glow from the side portions as a visual effect when the side portions are exposed due to displacement of the wheel segments 306. In another example, the side portions of each wheel segment 306 may each include a display panel, e.g., and OLED, microLED, LCD, or other type of display panel that may be configured to display graphical content that may be coordinated, for example, with graphical content that is displayed on a display panel that provides the outer face 316 of the wheel segment 306 or with the movement of the wheel segment 306 relative to the adjacent wheel segments 306. For example, the side portion displays may be caused to display a linear visual effect, e.g., a line of flames or sparks or a glowing line, that extends across the display and moves such that the linear effect is always aligned with the outermost/uppermost edges of the adjacent wheel segments 306 as those wheel segments 306 move relative to the wheel segment 306 with the displays, which may serve to visually enhance the displacement effect.

The wheel display 300 of FIGS. 3 through 8 feature wheel segments 306 that pivot about rotational joints 354 when actuated by the actuation mechanism 310, which results in the outermost portions of the wheel segments 306 primarily experiencing translation along the common center axis 308 (with some translation in directions perpendicular to the common center axis 308, e.g., radially, as well as, of course rotation). Wheel displays based on the concepts discussed herein may also include wheel segments that are configured to undergo pure translation along the common center axis when actuated, e.g., without any pivoting about an axis normal to the center axis.

Figure 9:
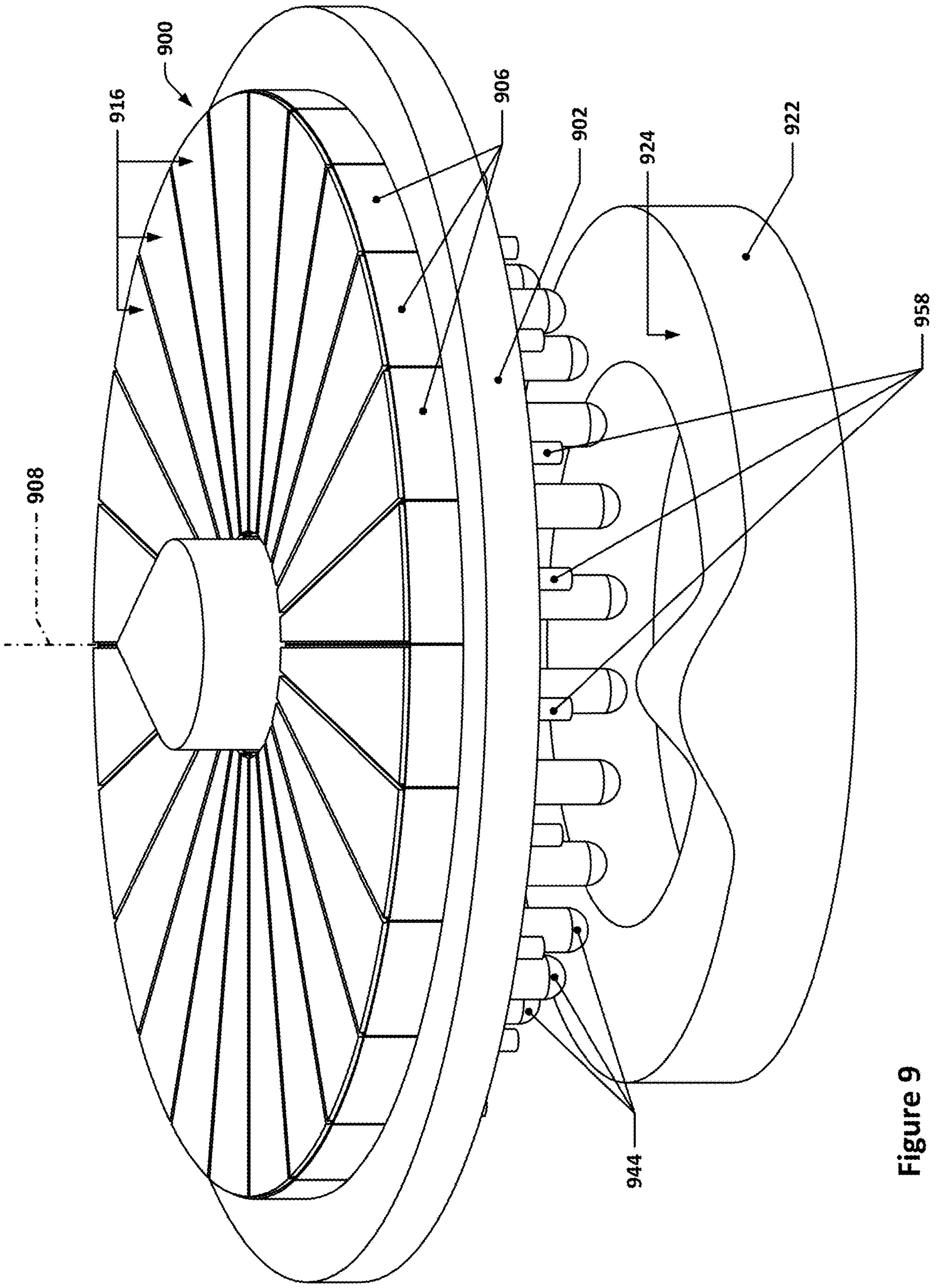
FIG. 9 depicts another example wheel display with movable wheel segments.
Figure 10:
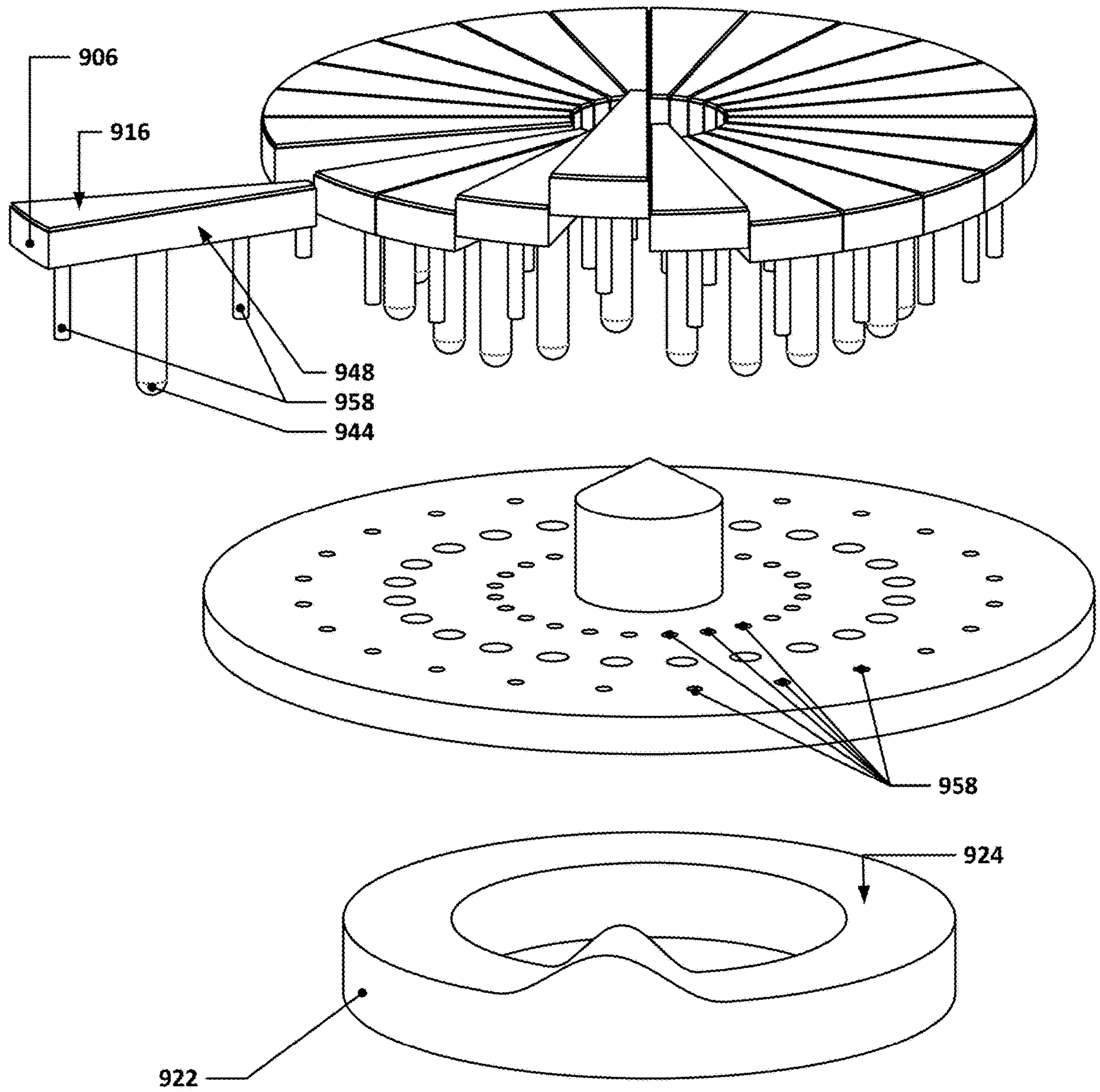
FIG. 10 depicts an exploded view of the example wheel display of FIG. 9
Figure 11:
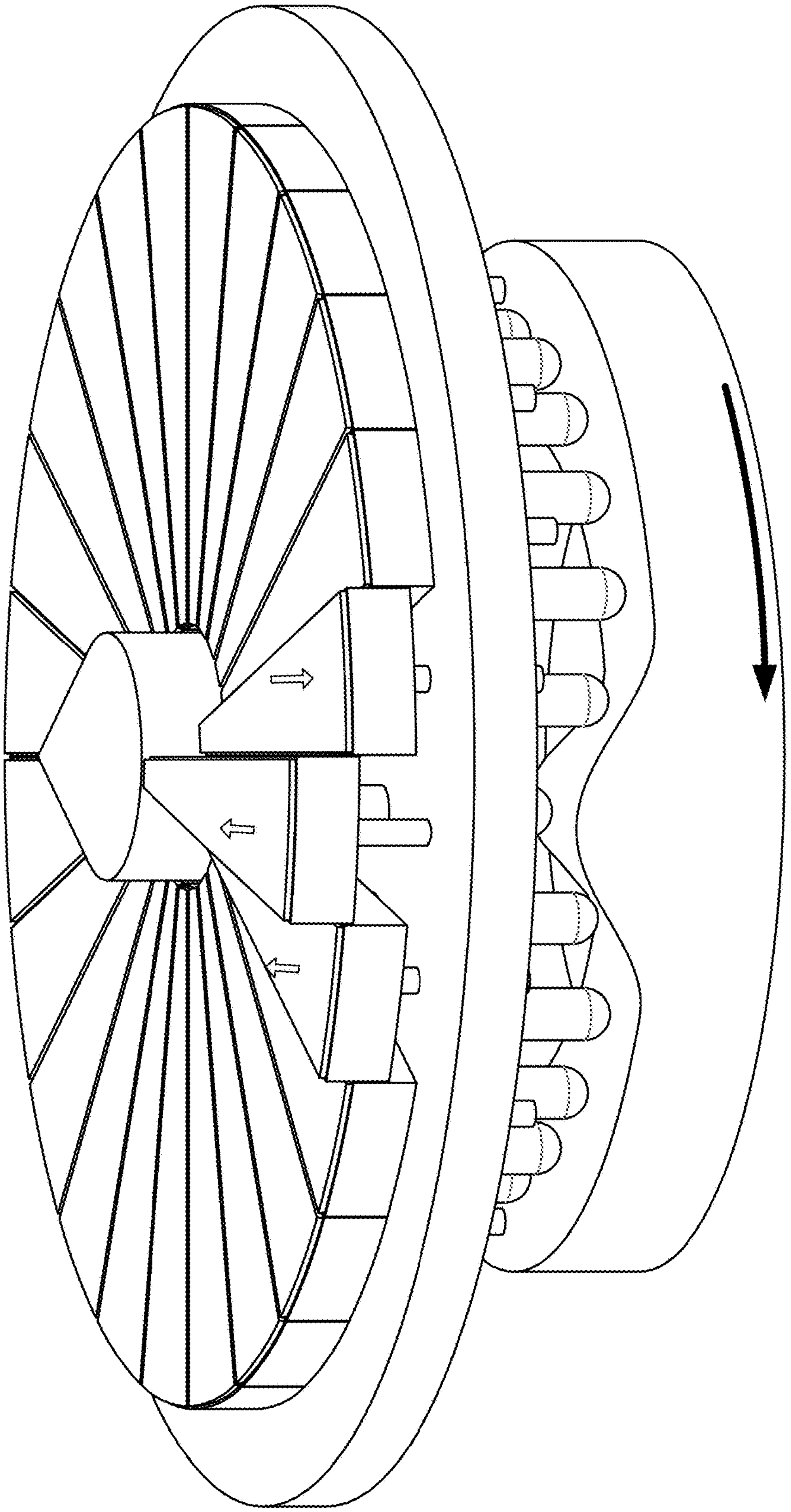
FIGS. 11 through 14 depict the example wheel display of FIG. 9 in various states of actuation.
Figure 12:
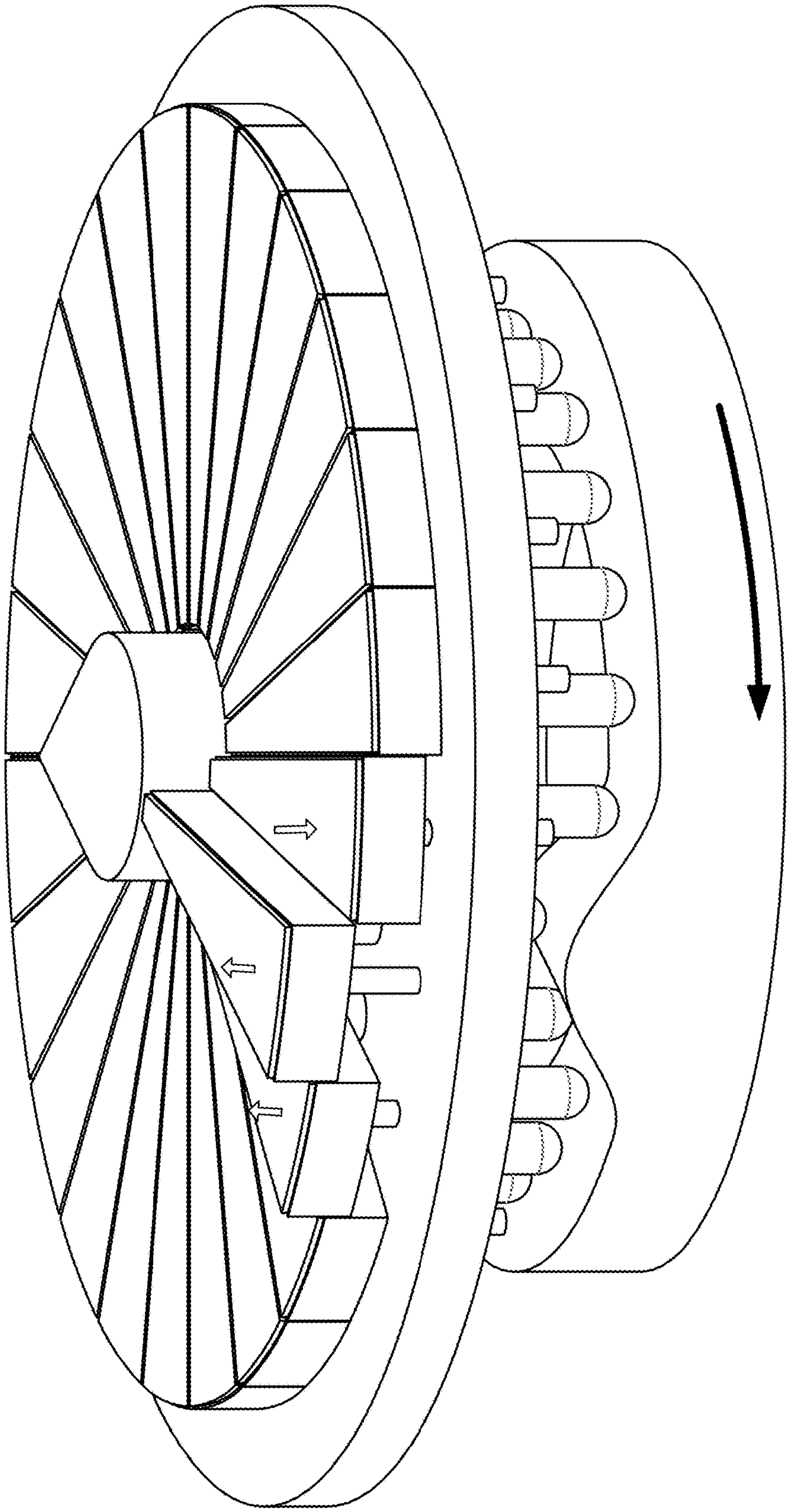
Figure 13:
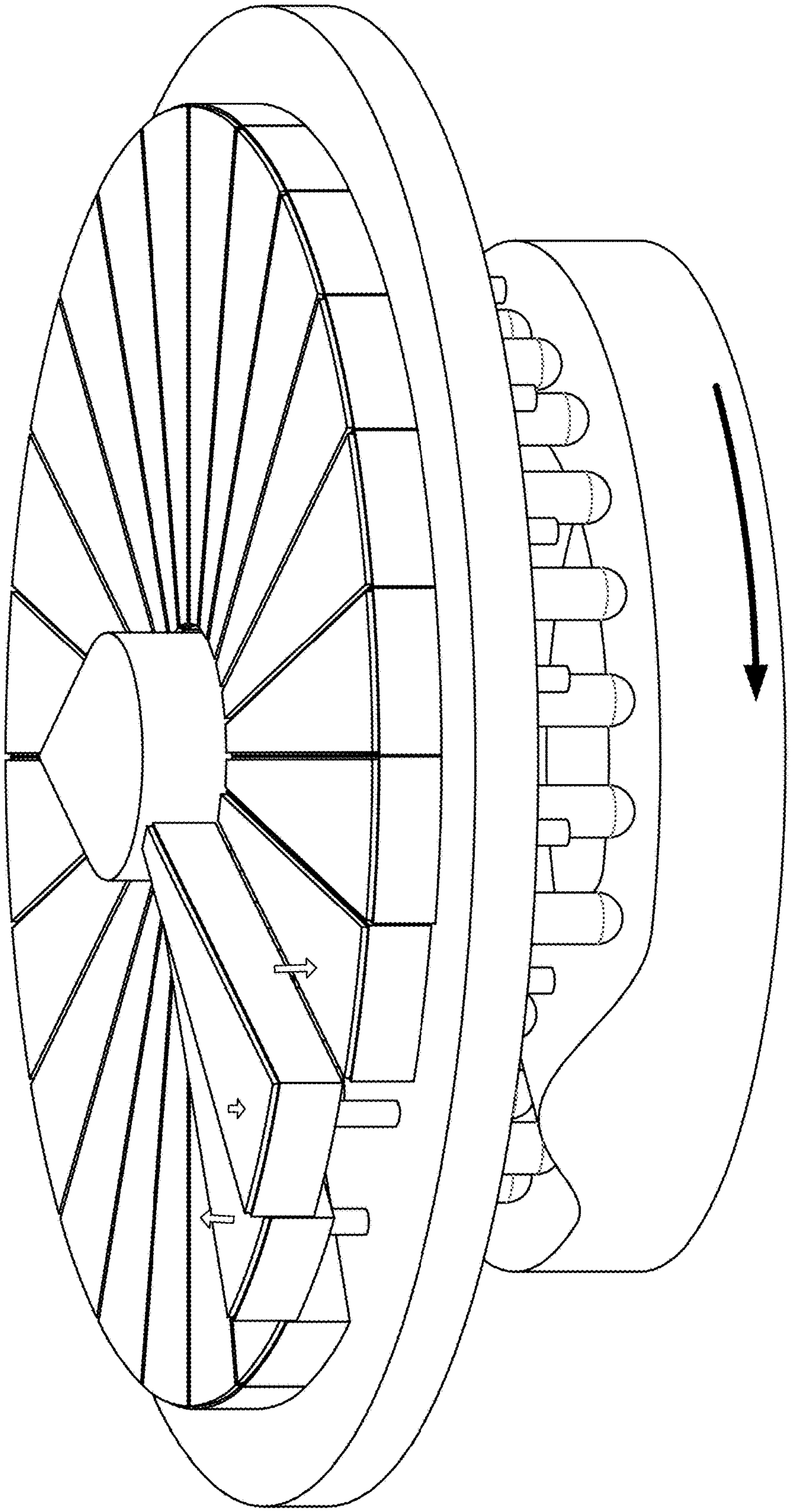
Figure 14:
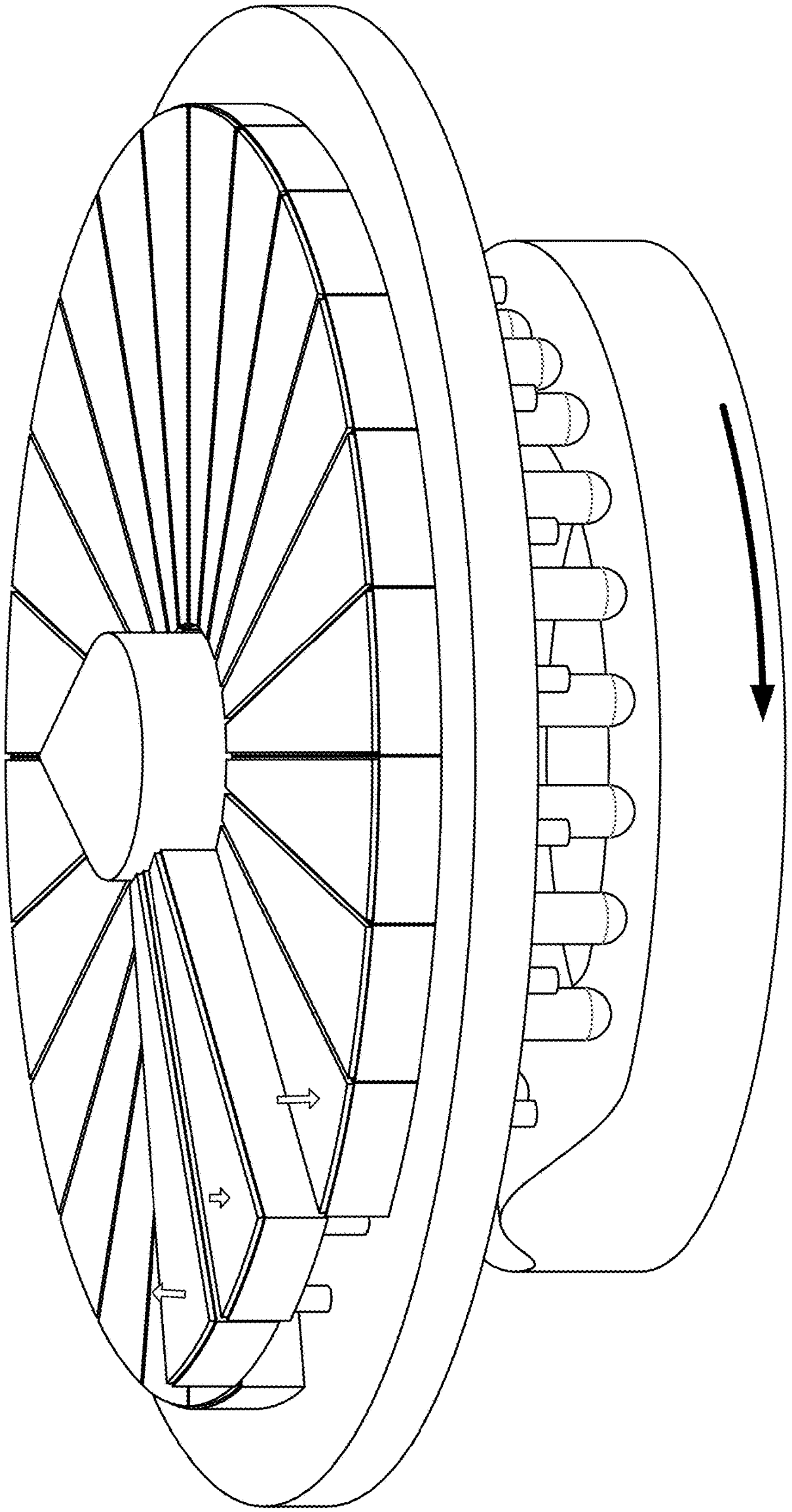

FIG. 9 depicts another example wheel display with movable wheel segments; FIG. 10 depicts an exploded view of the example wheel display of FIG. 9. Like wheel display 300, wheel display 900 may include a plurality of wheel segments 906 arranged around a common center axis 908 in a circular array. Wheel segments 906, however, are configured to slide up and down (or in and out) axially, i.e., in directions perpendicular to the common center axis 908. For example, the wheel segments 906 may include linear guides 958, e.g., rods, rails, or other types of structures, along with corresponding interfaces, e.g., holes, that may act to constrain movement of the wheel segments 906 to a particular axis. As discussed below with respect to FIG. 15, however, such movement constraints may be provided through other mechanisms as well, e.g., by the side portions of adjacent wheel segments.

Similar to the wheel display 3, the wheel display 9 further includes a rotary cam structure 922 which has an annular cam surface 924 that may be caused to rotate about the common center axis 908. The wheel segments 906 may include cam follower structures 944 that overlap the annular cam surface 924 when viewed along the rotation axis and may, when in contact with the annular cam surface 924, cause the wheel segments 906 to rise and fall (or move out and in) when a cam nose region of the annular cam surface 924 comes into contact with the cam follower structures 944. Such movement of the wheel segments 906 is depicted in FIGS. 11 through 14, where the annular cam surface 924 is caused to rotate about the common center axis in a clockwise direction and the cam nose region causes the wheel segments 906 to rise and fall in concert with such rotation.

For simplicity, FIGS. 9 and 10 do not depict the pointer indicator or actuation mechanism that would be used to cause the rotation of the rotary cam structure 922, although a pointer indicator and mechanism similar to that shown in FIG. 3 may be used. Additionally, such an actuation mechanism may optionally be configured to allow for axial displacement of the annular cam surface 924 relative to the wheel segments 906 such that the annular cam surface 924 may be brought into contact with the cam follower structures 944 or moved far enough away from the cam follower structures 944 that there is no contact between the annular cam surface 924 and the cam follower structures 944 (similar to implementations discussed above with respect to the wheel display of FIG. 3), which may allow the wheel segments 906 to be placed in a non-displaced state relative to each other initially and then transitioned to a displaced state gradually as the annular cam surface 924 is brought into contact with the cam follower structures 944. In other implementations, the annular cam surface 924 may not be movable relative to the wheel segments 906 along the common center axis 908 and may thus always be kept in contact with the cam follower structures 944.

The wheel segments 906 may, as with the wheel segments 306, optionally have display panels, graphics, and/or illumination devices on them, e.g., on the outer faces thereof and/or the side portions thereof, to display graphical content (either static or animated) in concert with actuation of the wheel display.

It will be understood that the wheel displays discussed above rely on relative rotational movement between the wheel segments and the annular cam surfaces in order to provide the displacement effect of the wheel segments; in the depicted examples, the wheel segments do not rotate about the common center axis while the annular cam surface (and thus the pointer indicator) rotates about the common center axis. However, other implementations may feature stationary annular cam surfaces and have wheel segments that rotate about the common center axis, e.g., by rotating the support structure that supports the wheel segments about the common center axis, instead to achieve the relative rotation between the wheel segments and the annular cam surface. In such implementations, the pointed indicator may remain stationary. In yet other implementations, both the wheel segments and the annular cam surfaces (and the pointer indicator, if used) may rotate relative to each other and to the world coordinate system, i.e., the surrounding environment.

It should also be understood that while the wheel segments shown in the Figures herein are sector-shaped or annular sector-shaped, the wheel segments need not necessarily be of such shapes. For example, other shapes that are able to be arranged more or less in a radial manner may be used as well—such shapes also need not always be directly adjacent. For example, in some implementations, each wheel segment may be cylindrical in appearance (similar, for example, to the posts that provide the cam follower structure 944 in FIG. 9) and may be arranged in a circular array with each cylinder being separated from the adjacent cylinders by a gap (for example, such as would be the case if the sector-shaped wheel segments of FIG. 9 were simply removed, leaving behind the posts providing the cam follower structures 944).

In yet other examples, the wheel segments may be generally sector-shaped, but may have side portions that do not define a linear edge when viewed along the common center axis of the wheel display. Instead, such side portions may be defined by profiles or edges that may have protrusions and recesses that intermesh with complementary recesses and protrusions on the adjacent side portions of adjacent wheel segments—fitting together somewhat in the manner of a jigsaw while still allowing for relative motion of the wheel segments as described herein. For example, a side portion may have a semi-circular profile rib that extends along a direction parallel to the common center axis, and an adjacent side portion may have a semicircular groove that extends along that same direction and is positioned to intermesh with the rib. Similar such complementary feature sets may be used on any pair of adjacent wheel segment surfaces (not only on the side portions). For example, if multiple concentric rings of wheel segments are used (as discussed later herein), the surfaces of wheel segments in one ring of wheel segments and the adjacent surfaces of wheel segments in a neighboring ring of wheel segments may include such features.

The cam follower structures depicted herein may, for example, include rollers or other low-friction devices to reduce noise and wear. In the depicted examples, the wheels are shown with the center axes in a generally vertical orientation, in which case the weight of the wheel segments may act to restore the wheel segments to their "undisplaced" configurations after being actuated by the cam nose region. Other implementations may have the wheel displays oriented such that the center axes are horizontal or at an angle. In such alternate implementations, the wheel segments may be biased, e.g., by a spring (a linear extension or compression spring, a torsion spring, a Belleville washer stack, metal springs, composite springs, plastic springs, etc.), so as to return to their undisplaced configurations after actuation. For example, in the wheel display 300, the undersides of the wheel segments 306 may be connected with a tension spring to the segment support 352 or other structure to draw the wheel segments 306 into contact with the segment support 352.

The motors and drive systems that may be used to drive the wheel displays discussed above may be provided using any suitable technology. For example, while a geared transmission system is shown in FIG. 3, other drive systems may be used that use belts, rollers, or other systems to impart rotational input to the rotary cam structure (or the wheel segments, if the wheel segments are configured to rotate instead of the rotary cam structure). In yet other implementations, a direct-drive motor may be used, e.g., where the rotatable component is directly driven by the motor. Any suitable type of motor(s) may be used, e.g., stepper motors, servo motors, AC or DC brushed motors, brushless motors, etc.

The above-discussed implementations feature wheel displays where the movement of the wheel segments is "fixed" due to such movement being driven by the annular cam surface, e.g., the wheel segments may only be able to be caused to move in a circumferential "wave" or "pulse" pattern. In other implementations, more granular control of the wheel segments may be provided that allows for not only wave and pulse patterns, but also for any number of other different movement patterns.

Figure 15:
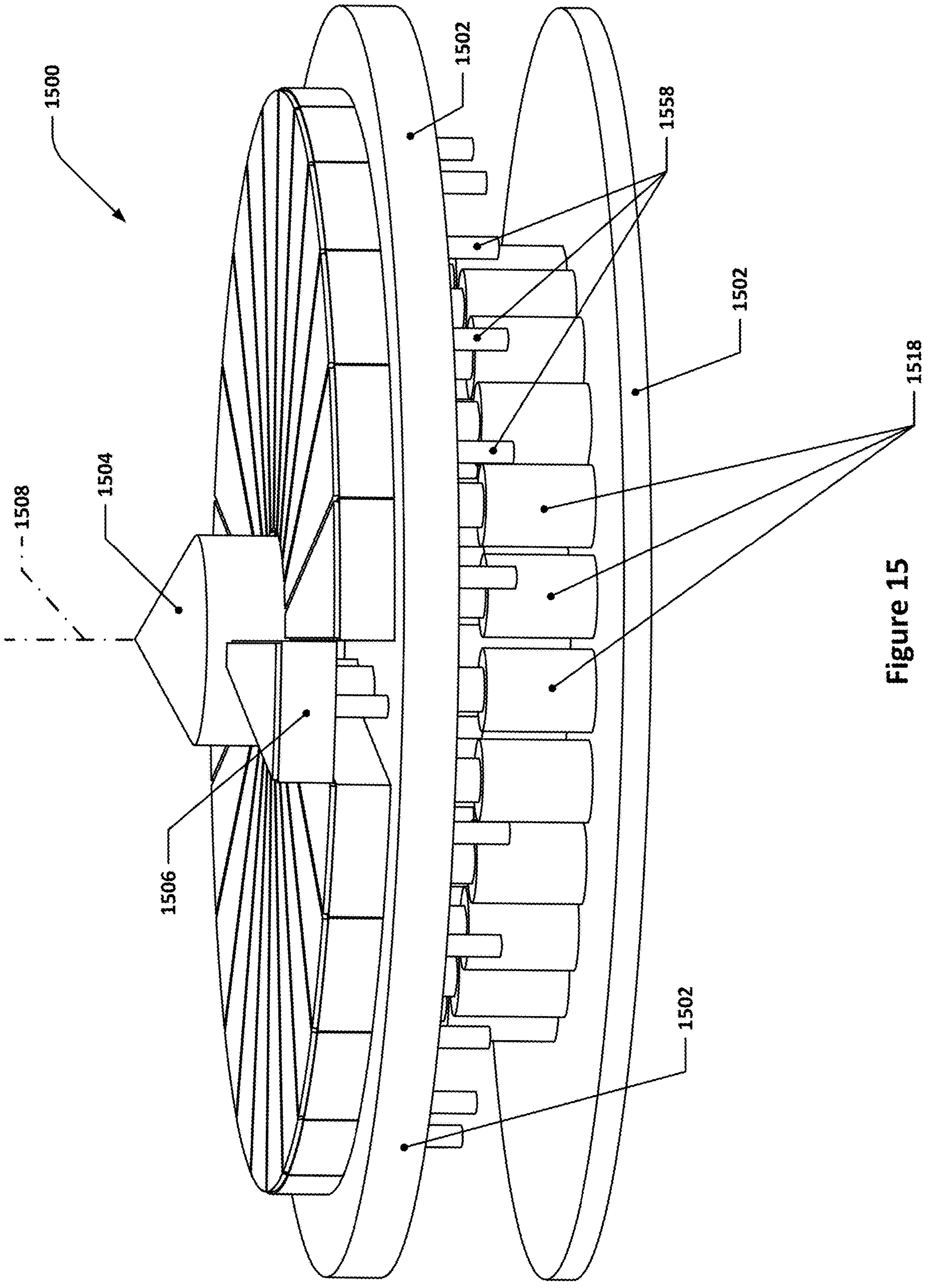
FIG. 15 depicts an example wheel display with wheel segments that can be independently actuated to translate along the center axis of the wheel display.
Figure 16:
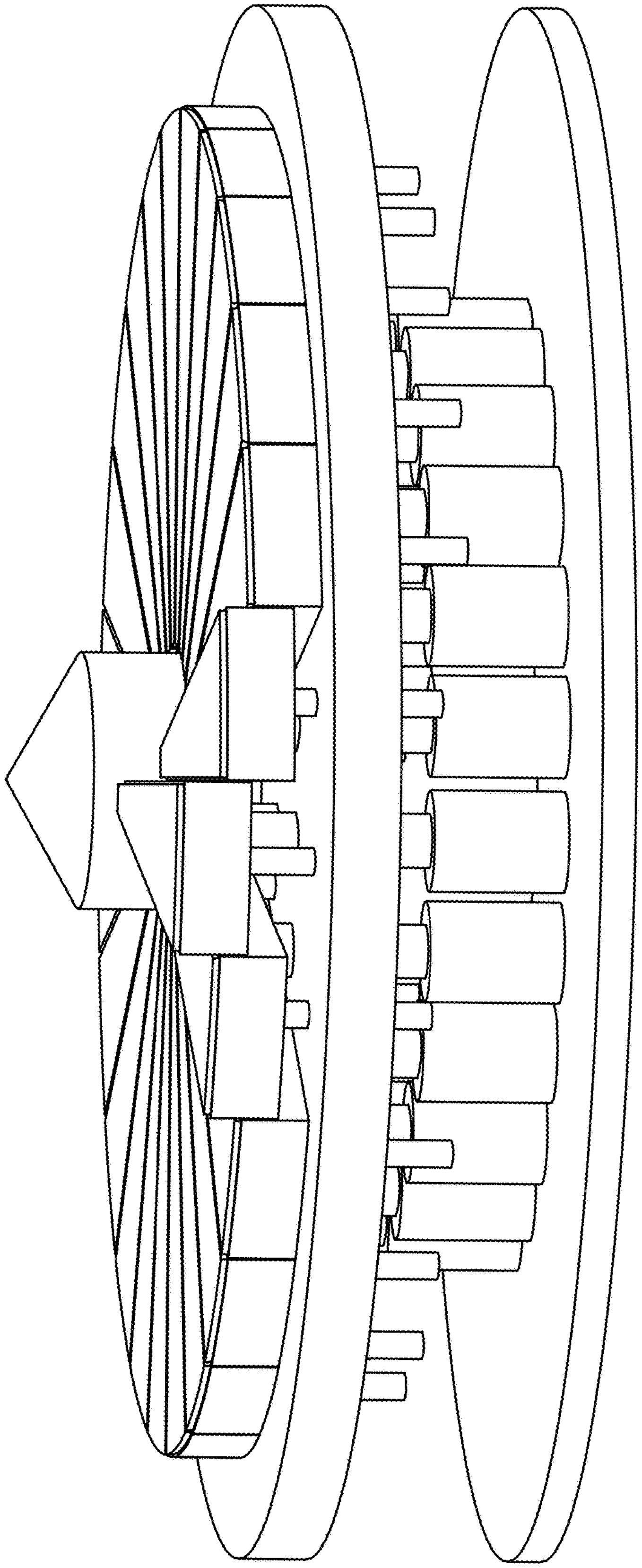
FIGS. 16 and 17 depict the example wheel display of FIG. 15 in two different states of actuation.

FIG. 15 depicts an example wheel display with wheel segments that can be independently actuated to translate along the common center axis of the wheel display. In FIG. 15, a wheel display 1500 with a plurality of wheel segments 1506 arranged in a circular array around a common center axis 1508 is shown. Each of the wheel segments 1506 is configured to slide or translate along an axis parallel to the common center axis 1508 and may be supported by a corresponding linear actuator 1518 or linear actuators) of the actuation mechanism (the actuation mechanism, in this case, includes a first portion that includes a support structure 1502 and a plurality of movable second portions in the form of the linear actuator pistons); the linear actuators 1518 may be considered, in aggregate, to represent the actuation mechanism. Each linear actuator 1518 may be connected with, and supported by, the support structure 1502 and may be configured to cause the wheel segment 1506 to which it is connected to translate in or out parallel to the common center axis 1508 when actuated. In some implementations, the wheel segments 1506 may optionally include one or more linear guides 1558 that may assist in constraining movement of the wheel segments 1506 to linear translation motion. Such linear guides 1558 may, for example, prevent rotation of the wheel segments 1506 relative to the linear actuators 1518 and about the linear extension axis of the linear actuators 1518 if the linear actuators 1518 do not, themselves, prevent such rotational motion. If linear actuators 1518 are used that inherently prevent rotation of the linear actuator piston, then linear guides 1558 may be omitted. Similarly, if the side portions of each wheel segment 1506 overlap the side portions of adjacent wheel segments 1506, regardless of the displaced or undisplaced state of each wheel segment 1506, when viewed along a direction perpendicular to the center axis 1508, then the adjacent wheel segments 1506 may act to prevent such rotation motion and the linear guides 1558 may be omitted. It will be understood that, in some implementations, the motion of the wheel segments may be constrained to translation along axes that are not necessarily aligned with the center axis—for example, linear guides 1558 and/or linear actuators 1518 may be configured to cause the wheel segments 1506 to translate along axes that are at an angular offset from the common center axis 1508 such that the wheel segments 1506 not only experience translation along the common center axis 1508 when actuated, but also experience simultaneous radial translation as well, giving the appearance that the wheel segment is not only moving closer to the viewer, but is also "exploding" radially outward. For example, linear guides 1558 may be aligned such that the axis to which they constrain the translation of the wheel segments 1506 intersects the common center axis 1508 but is also at an angle, e.g., up to ±10°, with respect to the common center axis 1508. The implementation of FIG. 9 may be similarly configured, if desired.

In contrast to the implementations discussed earlier where the actuation mechanism included a rotary cam structure that actuated the wheel segments in synchronicity with rotation of the rotary cam structure (and thus with a pointer indicator that was optionally fixed in space relative to the rotary cam structure), the implementation of FIG. 15 does not utilize an actuation mechanism in which there is a rotary cam structure that rotates. As a result, any pointer indicator that may be used to indicate a desired wheel segment outcome in the implementation of FIG. 15 may need to be moved relative to the wheel segments 1506 through a separate drive system. For example, the support structure 1502 may be caused to rotate relative to a stationary pointer indicator (not shown) to indicate a desired wheel segment outcome, if desired, by mounting it to a rotatable mount driven by a motor. Alternatively, the support structure 1502 may be kept stationary while a ring with a pointer indicator is caused to rotate about the center axis 1508 and the support structure 1502 to indicate the desired wheel segment outcome. As shown, the support structure 1502 includes two discrete components; other structures (not shown) may be arranged to fix the two discrete components in space relative to each other.

The wheel segments 1506 may, as with the wheel segments 306 and 906, optionally include graphics, display panels, and/or illumination devices for conveying visual effects and/or content indicating potential outcomes associated with the wheel segments.

Figure 17:
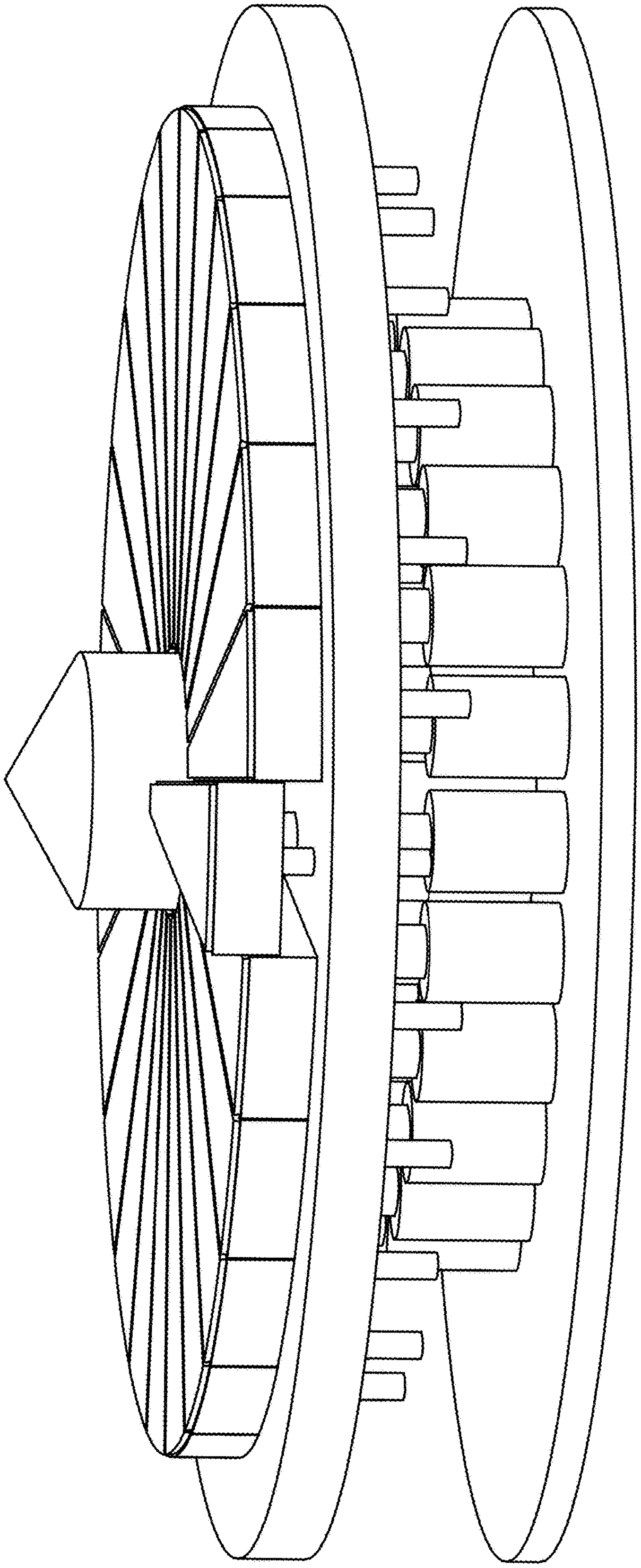

By controlling the linear actuators 1518 appropriately, any number of different visual effects may be produced through displacement of the wheel segments 1506. For example, the wheel segments 1506 may be caused to be displaced in a "pulse" or "wave" pattern that is aligned with the location of the pointer indicator, similar to the effect produced by the annular cam surfaces discussed earlier and as shown in FIG. 16. If desired, a single wheel segment 1506 may be displaced at a time, as shown in FIG. 17. It will be readily appreciated that any desired pattern of movement may be produced in such a system since each wheel segment may be independently actuated. For example, after a wheel spin (or before), it may be desirable to populate the wheel segments with potential outcomes for the next wheel spin, e.g., by randomly redistributing the displayed outcomes and/or replacing some or all of the outcomes with other outcomes. In such an implementation, outcomes may be caused to be randomly displayed, moved, or removed on the wheel segments until a desired arrangement of outcomes is present on the wheel segments. Such an effect may be implemented on any of the wheel displays discussed herein, but the wheel display 1500 may be caused to complement such randomized re-population of the outcomes with corresponding randomized movement of the wheel segments, which may give the visual impression that the outcomes are being physically "shuffled" to arrive at the final pattern of outcomes provided by the wheel display.

The concepts discussed herein are not only applicable to wheel displays having a single circular array of wheel segments, but may also be implemented to provide for wheel displays having multiple concentric rings of wheel segments, e.g., similar to a dartboard.

Figure 18:
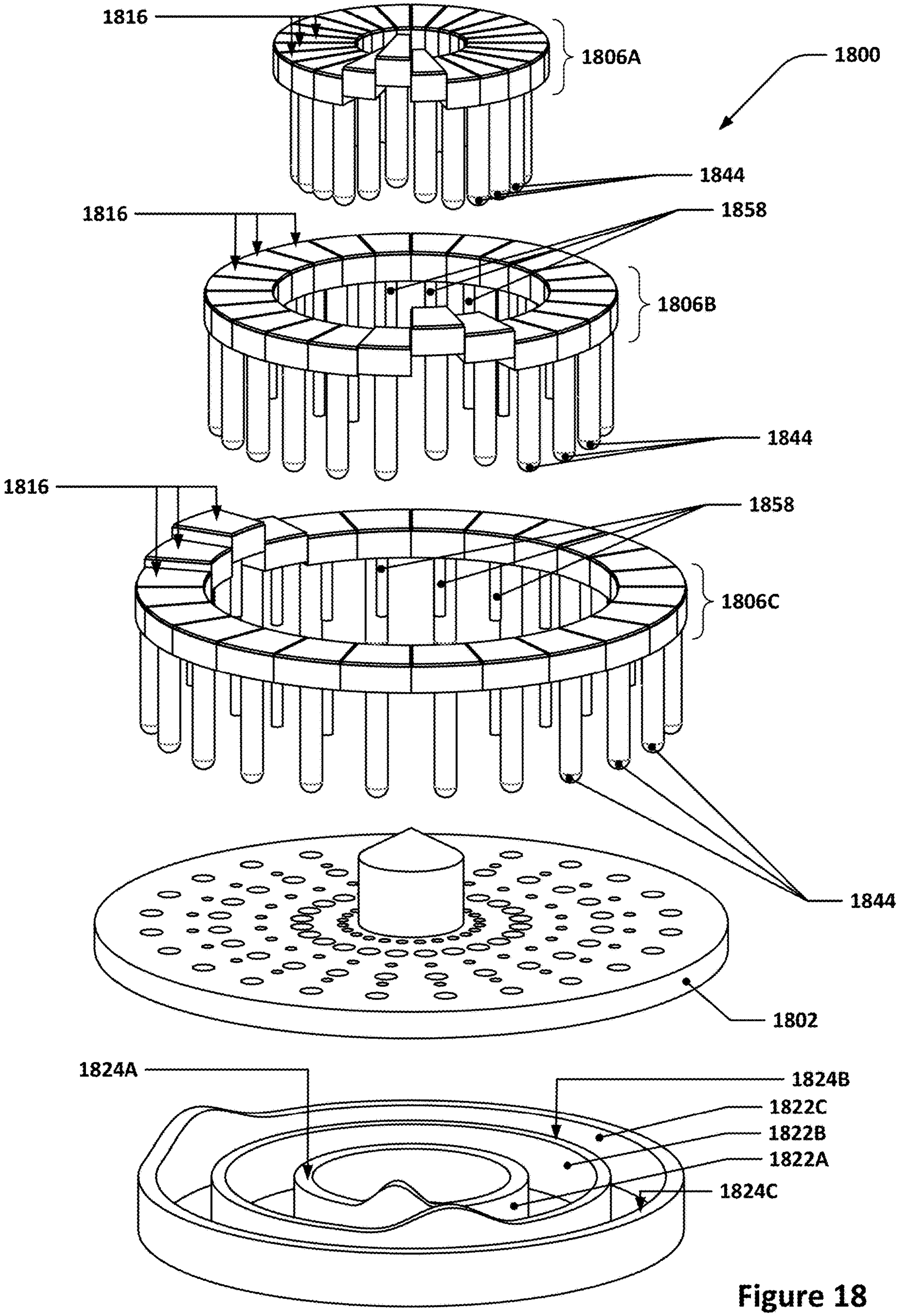
FIG. 18 depicts an exploded view of an example wheel display featuring multiple concentric rings of movable wheel segments.

FIG. 18 depicts an exploded view of an example wheel display featuring multiple concentric rings of movable wheel segments. In FIG. 18, a wheel display 1800 is shown that includes three concentric rings of wheel segments 1806—an inner ring of wheel segments 1806A, a middle ring of wheel segments 1806B, and an outer ring of wheel segments 1806C. Similar to the wheel display of FIG. 9, each wheel segment 1806 may be constrained to translate along an axis that is nominally perpendicular to the center axis 1808 (see FIG. 19) of the wheel display, e.g., by linear guides 1858 or some other mechanism that may allow the wheel segments 1806 to move in and out relative to a support structure 1802 without otherwise moving relative to the support structure 1802. Each wheel segment 1806 may be caused to translate in a direction parallel to the center axis 1818 through contact of a corresponding cam follower structures 1844 of the wheel segment 1806 with a corresponding rotary cam structure 1822, e.g., the wheel segments 1806A may be actuated through contact of their respective cam follower structures 1844 with an annular cam surface 1824A of a rotary cam structure 1822A, the wheel segments 1806B may be actuated through contact of their respective cam follower structures 1844 with an annular cam surface 1824B of a rotary cam structure 1822B, and the wheel segments 1806C may be actuated through contact of their respective cam follower structures 1844 with an annular cam surface 1824C of a rotary cam structure 1822C. Each of the rotary cam structures 1822 may be separately driven, e.g., by a respective motor, so as to be independently rotatable relative to the other rotary cam structures 1822. In some implementations, however, the rotary cam structures may be driven in concert, e.g., through the input of a single motor—in some such implementations, one or more belt drives, gear trains, or other mechanisms may be used to cause the different rotary cam structures to rotate at different rates or in different directions responsive to a single rotary input, e.g., to cause the appearance of independent motion without utilizing multiple drive motors.

Each of the wheel segments 1806 may, as noted earlier, be marked with a fixed graphic, e.g., a prize or award indicator, a game bonus, a spin again indicator, or other reward indicator located on a respective outer face 1816 of the wheel segment. In some implementations, each of the outer faces 1816 of one or more, and in some cases all, of the concentric rings of wheel segments may have outer faces 1816 that are provided by display panels, illumination devices, or other electronically controllable devices. Such implementations may allow for dynamic lighting effects or for changeable or animated content to be displayed on the outer faces 1816 and, for example, changed or reconfigured for each "spin" of the wheel display.

Figure 19:
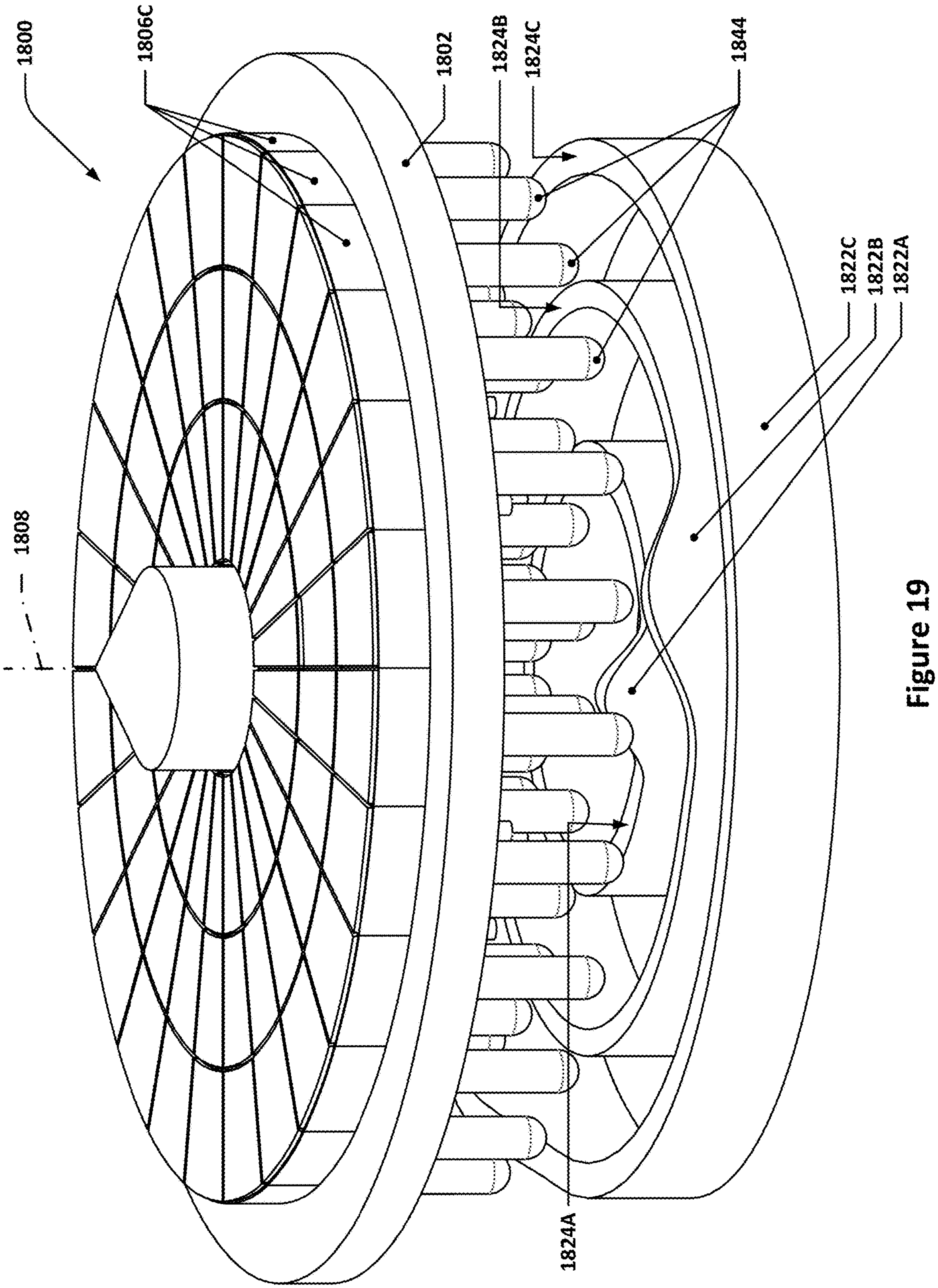
FIG. 19 depicts the example wheel display of FIG. 18 in a non-actuated state.
Figure 20:
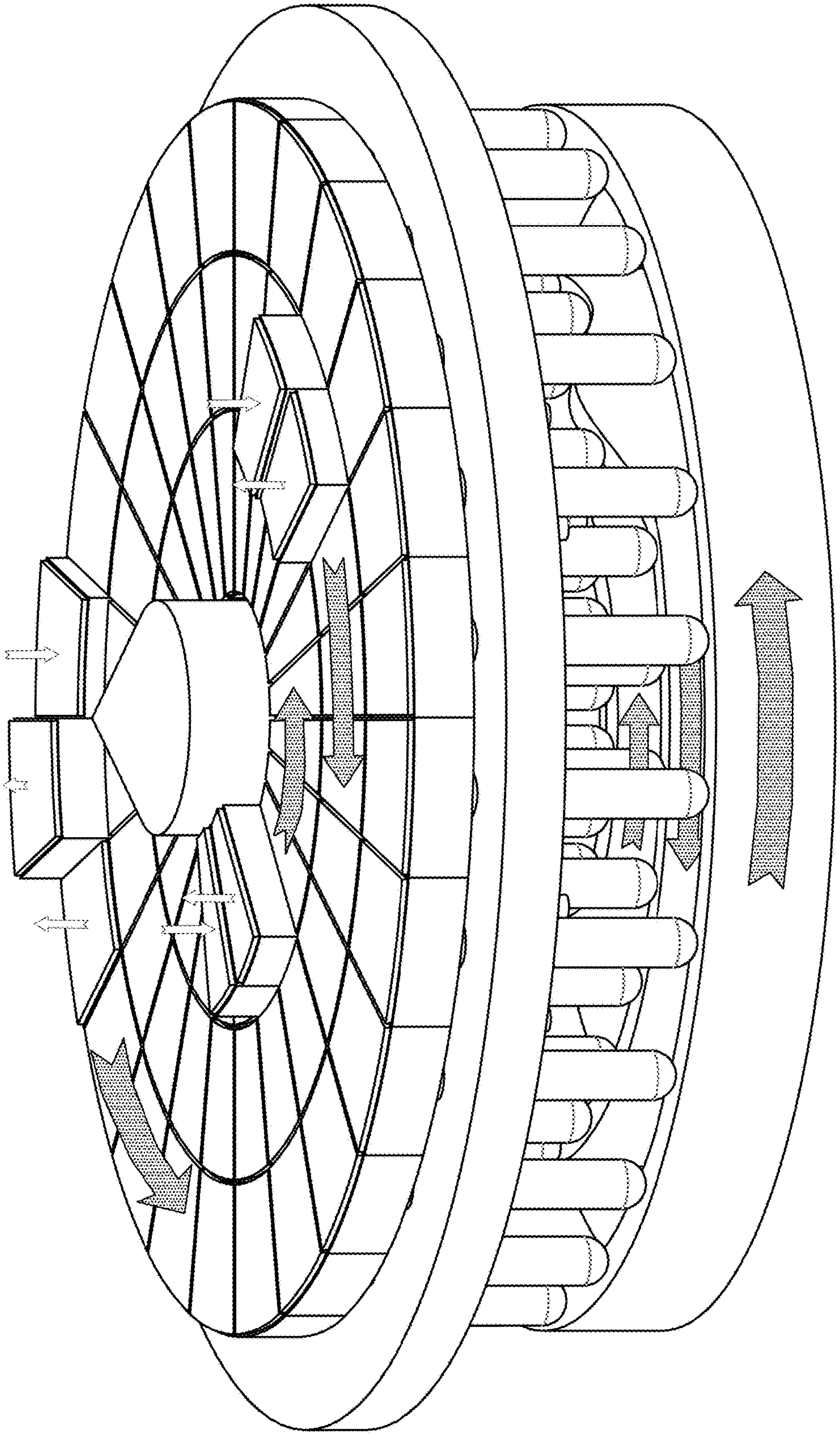
FIGS. 20 through 23 depict the example wheel display of FIG. 18 in various actuated states.
Figure 21:
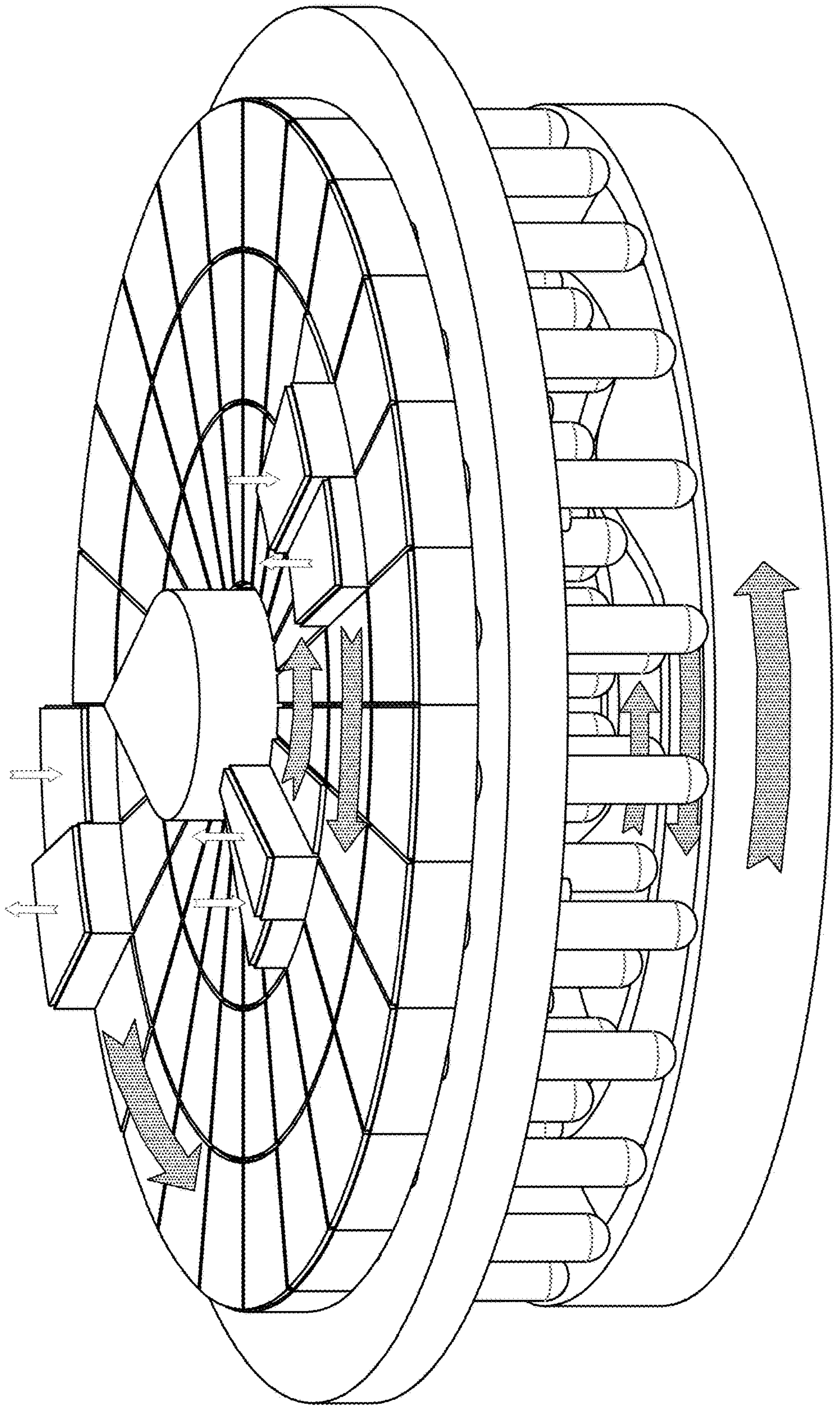
Figure 22:
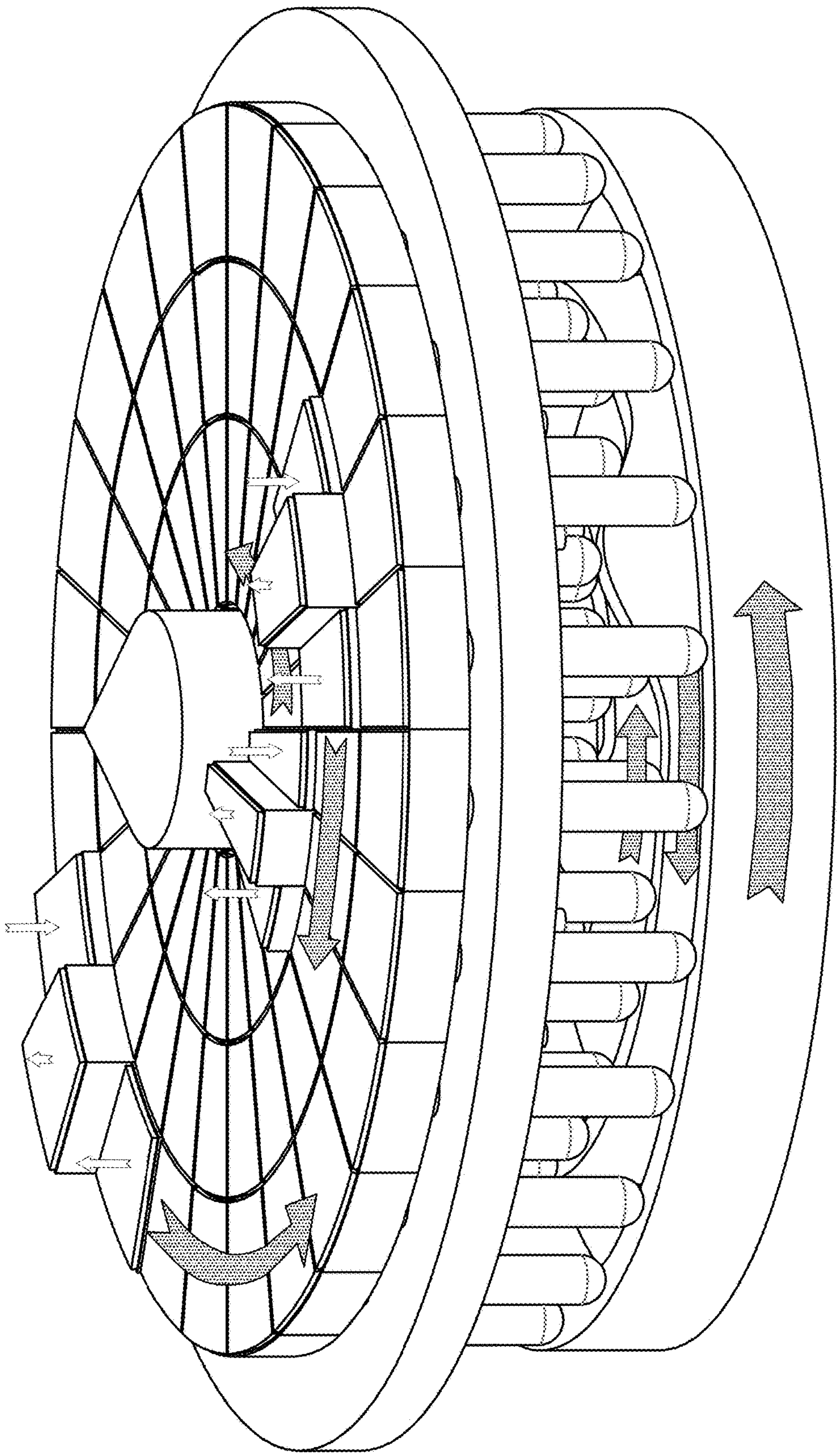
Figure 23:
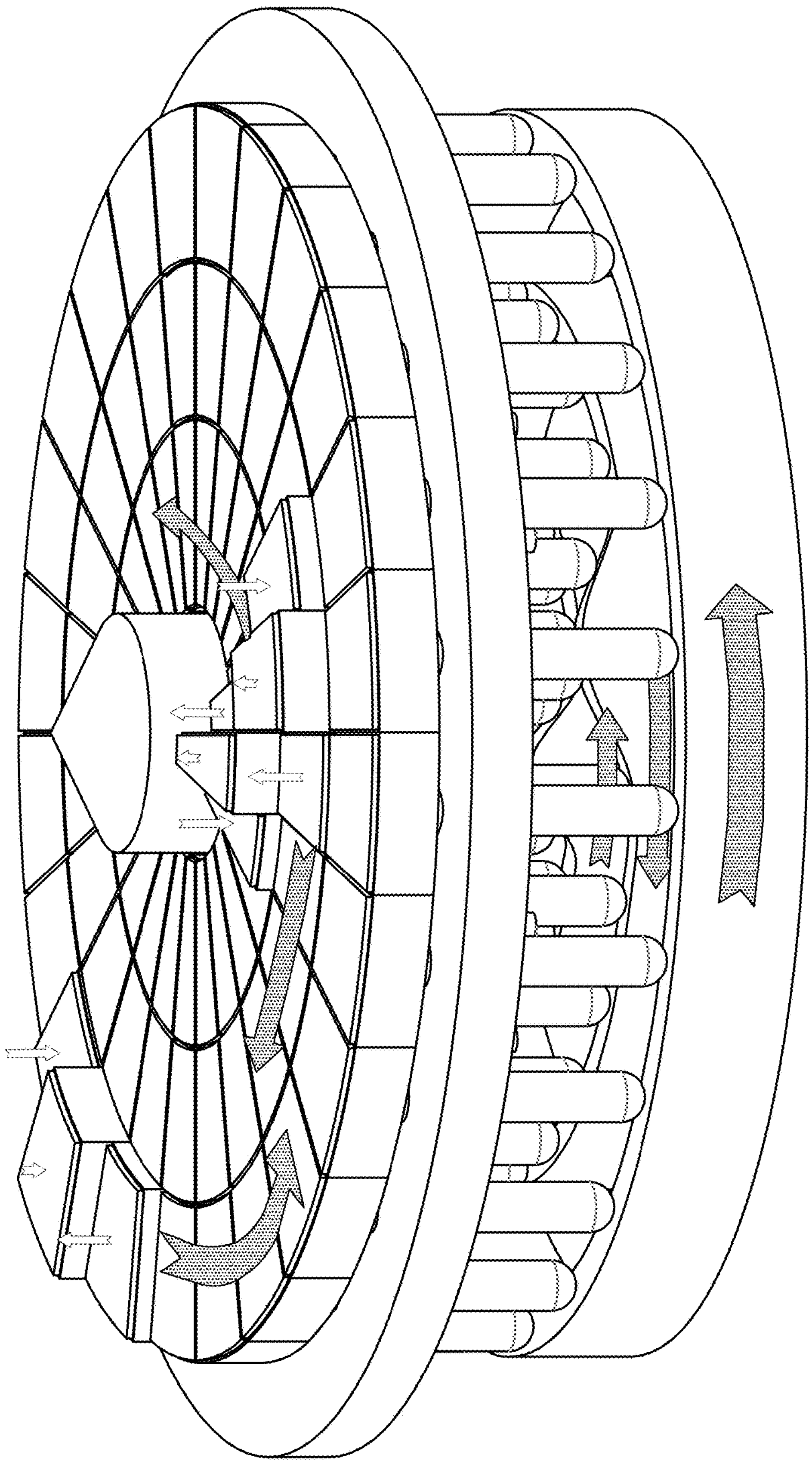

FIG. 19 depicts the example wheel display of FIG. 18 in a non-actuated state. As can be seen, by translating the rotary cam structures 1822 so that they are not in contact with the cam follower structures 1844, the wheel segments 1806 may be caused to all be in-plane with one another, presenting a flat wheel display. When it is desired to actuate the wheel segments 1806, the rotary cam structures 1822 may be caused to translated so that the annular cam surfaces 1824 come into contact with the cam follower structures 1844 of the wheel segments 1806, much as was described earlier with respect to the implementation of FIG. 9. The motors or other systems used to provide rotational input to the rotary cam structures 1822 are not shown in FIG. 18, but any suitable drive system or motor(s) may be used, e.g., motors with belt drives, motors with gear drives, direct-drive motors, stepper motors, etc.

FIGS. 20 through 23 depict the example wheel display of FIG. 18 in various actuated states. In FIGS. 20 through 23, the rotary cam structures 1822 have been translated so that the annular cam surface 1824 of each rotary cam structure 1822 has engaged with the corresponding cam follower structures 944 of the corresponding wheel segments 1806. In FIGS. 20 through 23, the inner and outer rotary cam structures 1822A and 1822C have both been caused to rotate in a counterclockwise manner (as shown by the shaded arrows), whereas the middle rotary cam structure 1822B has been caused to rotate in a clockwise manner (as also shown by the shaded arrows). As can be seen from FIGS. 20 through 23, this causes the wheel segments 1806 in each of the concentric rings of wheel segments 1806 to be translated outwards and inwards in a circular wave or pulse fashion, similar to that produced through the operation of the implementation of FIG. 9. However, multiple such pulses may be provided simultaneously, with each concentric ring of wheel segments 1806 providing a pulse of the wheel segments 1806 belonging thereto at different speeds and/or directions. In some implementations, the wheel segments 1806 in some of the rings may be caused to stop at different times.

In the depicted example wheel display 1800, no pointer indicator is shown, although such wheel displays may include one or more pointer indicators, similar to that shown in the implementation of FIG. 9. In such wheel displays 1800 in which there are multiple pointer indicators, each such pointer indicator may be affixed to a respective one of the rotary cam structures 1822 so that it rotates with that rotary cam structure 1822. To facilitate such rotation, a gap may be provided between each concentric ring of wheel segments 1806 (and through the support structure 1802) to allow clearance for a riser structure that is connected with the rotary cam structure 1822 for the corresponding ring of wheel segments 1806 and that supports the corresponding pointer indicator above the wheel segments; such a gap may be an open air gap or may be filled by structure, e.g., such as an annular wall that occupies the gap. In other implementations, no explicit pointer indicator may be used for some or all of the concentric rings of wheel segments 1806, with "winning" outcomes from each concentric ring of wheel segments being indicated through their relative heights, e.g., the highest or furthest-protruding wheel segment 1806 from each concentric ring of wheel segments 1806 may be deemed to indicate the "winning" outcome for that ring of wheel segments 1806. In some such implementations, the drive motors for each rotary cam structure 922 may be controlled to ensure that each rotary cam structure 1822 stops in a location that provides a clear indication of which wheel segment 1806 is highest, e.g., the rotary cam structures 1822 may be controlled to ensure that they do not stop in a location that causes two circumferentially adjacent wheel segments 1806 to be at the same elevation relative to each other.

In some implementations of gaming machines featuring such multiple-ring wheel displays, the gaming machine may be configured to only award prizes or rewards for a wheel spin, or to provide enhanced rewards beyond what each individual wheel segment may award, when the wheel spin results in multiple wheel segments 1806 from different concentric rings of wheel segments 1806 being actuated in a manner that causes the actuated wheel segments 1806 to form a particular pattern. For example, if all three of the depicted concentric rings of wheel segments 1806 in FIGS. 20 through 23 were to stop moving such that each furthest-protruding wheel segment 1806 of each concentric ring of wheel segments 1806 were to extend in a single line from the center of the wheel display to the edge, then such an outcome may be viewed as a winning outcome or as an outcome that may be eligible for an enhanced reward, e.g., a jackpot or other larger-denomination reward.

It will be understood that the implementation of FIGS. 18 through 23 may also be implemented using independent linear actuators, similar to the implementation of FIG. 15, in which case the movement of wheel segments 1806 in each concentric ring of wheel segments 1806 may be controlled in any desired manner, i.e., not necessarily tied to a circumferential pulse or wave effect as may be provided by the use of the rotary cam structure features discussed above.

It will also be understood that other concentric-ring arrangements of movable wheel segments may include fewer or greater numbers of concentric rings of wheel segments, e.g., 2 rings, 4 rings, 5 rings, etc. In implementations featuring the use of concentric rings of wheel segments, the wheel segments for each concentric ring may be thought of as being grouped into sets, with each set of such wheel segments being arranged so as to encircle a center-most set of wheel segments, e.g., the set of inner wheel segments 1806A discussed above, and such that each additional set of wheel segments beyond the center-most set of inner wheel segments encircles a different number of additional sets of wheel segments, e.g., in the previous example, the set of middle wheel segments 1806B encircles zero additional sets of wheel segments (the set of inner wheel segments 1806A not being counted as an additional set of wheel segments in this example) and the set of outer wheel segments 1806C encircling one set of wheel segments (the set of middle wheel segments 1806B).

In some implementations, the wheel displays may omit an explicit pointer indicator, with the selected wheel segment being indicated solely by the extent to which it is displaced, e.g., the wheel segment that is displaced furthest along the common center axis may be deemed the selected wheel segment. In yet other implementations, the pointer indicator may be provided virtually, e.g., as a graphic that is displayed on an annular display panel that encircles the wheel segments.

It will be understood that the term "rotary cam structure," as the term is user herein, is used to refer to cam structures that may experience relative rotational displacement about a rotational axis relative to wheel segments and thereby cause displacement of at least portions of the wheel segments along the rotational axis—as discussed earlier, the relative rotational displacement may involve the rotary cam structure remaining stationary—the camming effect, however, is still due to relative rotary movement.

As discussed earlier in this application, the wheel displays explored above and in the Figures may include a controller that may control various aspects of a wheel display's operation. Such controllers may include memory devices that store software or computer-executable instructions for controlling the various components of a wheel display.

Such computer software may be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the computer software can be executed by different devices, for example in a client server relationship. Persons skilled in the art, will appreciate that computer software provides a series of instructions executable by the processor.

Such controllers may be configured, e.g., through appropriate computer software or other control mechanisms, to drive the motor or motors used in wheel displays, actuate linear actuators, or otherwise control the actuation mechanisms used to effect movement of the wheel segments. In some implementations, a controller may be configured to cause the actuation mechanism to stop in a position that clearly produces a single "most displaced" wheel segment in a contiguous grouping of adjacent wheel segments, thereby avoiding a "tie" where two adjacent wheel segments are displaced the same amount or nearly the same amount, which may cause confusion as to which outcome is the selected outcome. In some such implementations, the controller may control the actuation mechanism such that the "most displaced" wheel segment of a contiguous group of adjacent wheel segments is more displaced than the wheel segments on either side of the most displaced wheel segment by at least 10%, 20%, or 30% of the total possible displacement travel of the wheel segments.

In some additional or alternative implementations, a wheel display controller may be configured to allow a player to provide one or more inputs selecting various wheel segments prior to a wheel spin. Such inputs may be provided, for example, through the player pressing, touching, or "bashing" (assuming the wheel display is reinforced to withstand such forceful inputs) one or more wheel segments. When the wheel spin is finished, the controller may only award the selected outcome if the selected outcome (from the wheel spin) is associated with one of the one or more wheel segments selected by the player.

It is to be understood that the phrase "for each <item> of the one or more <items>," if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

Terms such as "about," "approximately," "substantially," "nominal," or the like, when used in reference to quantities or similar quantifiable properties, are to be understood to be inclusive of values within ±10% of the values or relationship specified (as well as inclusive of the actual values or relationship specified), unless otherwise indicated.

The disclosure is not limited to the specific implementations described herein, but rather, components of the systems and/or articles and/or steps of the methods may be utilized independently and separately from other components and/or steps described herein. For example, the configuration of components described herein may also be used in combination with other processes, and is not limited to practice with the systems, articles, and related methods as described herein. Rather, the example implementation can be implemented and utilized in connection with many applications in which a game or bonus game is desired.

Although specific features of various implementations of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the implementations of the present disclosure, including the best mode, and also to enable any person skilled in the art to practice the disclosure, including making and using any devices or systems and performing any incorporated methods. The patentable scope of the implementations described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A system comprising:

a wheel display assembly including:

a support structure;

a set of first wheel segments radially arranged around a common center axis; and an actuation mechanism configured to be transitioned between a plurality of actuated configurations, wherein:

the actuation mechanism includes a plurality of linear actuators, each first wheel segment is connected with a different subset of one or more linear actuators of the plurality of linear actuators, the first wheel segments in the set of first wheel segments are supported, at least in part, by the support structure, the actuation mechanism has a first portion that is fixed relative to the support structure and one or more second portions that are movable relative to the support structure to transition the actuation mechanism between the plurality of actuated configurations, the first wheel segments are each movably connected with the support structure and are each interfaced with a second portion of the one or more second portions of the actuation mechanism such that each of the first wheel segments is at least movable between at least two corresponding wheel segment configurations, including a first wheel segment configuration and a second wheel segment configuration, relative to the support structure in response to the actuation mechanism transitioning to a corresponding one of the actuated configurations, transitioning of each first wheel segment between the corresponding first wheel segment configuration and the corresponding second wheel segment configuration causes at least a first sub-portion of that first wheel segment to at least translate along a direction parallel to the center axis, and each of the subsets of one or more linear actuators is configured to be able to be selectively actuated to cause the first wheel segment connected therewith to transition between at least the first wheel segment configuration and the second wheel segment configuration for that first wheel segment.

2. The system of claim 1, further comprising a controller that includes one or more processors and one or more memory devices, wherein the one or more memory devices store computer-executable instructions for controlling the one or more processors to cause the plurality of linear actuators to actuate during a first time period so as to cause the first wheel segments to move relative to each other so as to cause the first wheel segments to translate in a first direction and then in a second, opposite direction parallel to the center axis in a temporally staggered fashion such that only one first wheel segment is furthest from the support structure at any given point in time during such movement.

3. The system of claim 2, further comprising a pointer indicator, wherein:

the pointer indicator and the support structure are configured to permit relative rotational movement relative to each other, and the one or more memory devices further store additional computer-executable instructions for controlling the one or more processors to cause the relative rotational movement between the pointer indicator and the support structure to occur during the first time period such that the pointer indicator aligns with the first wheel segment that is furthest from the support structure at any given point in time during the rotational movement during the first time period.

4. The system of claim 3, wherein the one or more memory devices further store additional computer-executable instructions for further controlling the one or more processors to cause:

the relative rotational movement between the pointer indicator and the support structure to also occur during a second time period, and the plurality of linear actuators to position the first wheel segments to be in the same positions relative to the support structure during the second time period.

5. The system of claim 2, wherein the one or more memory devices further store additional computer-executable instructions for further controlling the one or more processors to cause:

the relative movement of the first wheel segments to stop after the first time period, and the first wheel segment that is furthest from the support structure when the relative movement of the first wheel segments stops to stop at a location that is displaced further than the two first wheel segments on either side of the first wheel segment that is furthest from the support structure by a distance X, wherein X is selected from the group consisting of: 10% of the total possible displacement of the first wheel segments along the center axis, 20% of the total possible displacement of the first wheel segments along the center axis, and 30% of the total possible displacement of the first wheel segments along the center axis.

6. The system of claim 1, wherein the wheel display assembly further includes one or more sets of second wheel segments radially arranged around the common center axis, wherein:

each set of second wheel segments encircles the set of first wheel segments and N sets of second wheel segments, N ≥0 and is different for each set of second wheel segments;

the second wheel segments in each set of second wheel segments are supported, at least in part, by the support structure, the second wheel segments are each movably connected with the support structure and are each interfaced with a second portion of the one or more second portions of the actuation mechanism such that each of the second wheel segments is at least movable between at least two corresponding wheel segment configurations, including a first wheel segment configuration and a second wheel segment configuration, relative to the support structure in response to the actuation mechanism transitioning to a corresponding one of the actuated configurations; and transitioning of each second wheel segment between the corresponding first wheel segment configuration and the corresponding second wheel segment configuration causes at least a first sub-portion of that second wheel segment to at least translate along a direction parallel to the center axis.

7. The system of claim 1, wherein each first wheel segment includes an outer face that has a sector-shaped or annular sector-shaped appearance.

8. The system of claim 1, wherein:

each first wheel segment is interfaced with a corresponding linear guide that constrains movement of the first wheel segment interfaced therewith to translation along a translation axis within 10° of parallel to the center axis.

9. The system of claim 1, wherein:

each first wheel segment is connected with a different subset of one or more linear actuators of the plurality of linear actuators, and the different subset of one or more linear actuators to which each first wheel segment is connected configured to translate that first wheel segment, when actuated, along a direction having a non-zero component parallel to the center axis and a non-zero component perpendicular to the center axis.

10. The system of claim 9, wherein the direction along which each first wheel segment is configured to translate is within 10° of the center axis.

11. The system of claim 1, wherein each first wheel segment includes an outer surface that includes a first display panel with a first display surface.

12. The system of claim 11, further comprising a controller that includes one or more processors and one or more memory devices, wherein the one or more memory devices store computer-executable instructions for controlling the one or more processors to cause the plurality of linear actuators to actuate so as to cause the first wheel segments to move relative to each other randomly.

13. The system of claim 12, where the one or more memory devices store additional computer-executable instructions for controlling the one or more memory devices to cause the first display panels of the first wheel segments to randomly populate with potential wheel spin outcomes in conjunction with the random movement of the first wheel segments.

14. The system of claim 11, wherein:

each of the first wheel segments is circumferentially interposed between two adjacent first wheel segments of the set of first wheel segments, each first wheel segment includes a first side portion and a second side portion, the first side portion includes a second display panel with a second display surface, the second side portion includes a third display panel with a third display surface, and the second and third display surfaces of each corresponding first wheel segment each face towards a different one of the two first wheel segments adjacent to the corresponding first wheel segment at least when the corresponding first wheel segment and the first wheel segments adjacent thereto are all in the corresponding first wheel segment configurations.

15. The system of claim 14, further comprising a controller including one or more memory devices and one or more processors, the one or more memory devices storing computer-executable instructions for causing the one or more processors to cause the second display panel and the third display panel of one of the first wheel segments to each display a linear visual effect at least when there is relative movement between that first wheel segment and the two first wheel segments adjacent thereto.

16. The system of claim 15, wherein the linear visual effect is selected from the group consisting of: a line of flames, a line of sparks, and a glowing line.

17. The system of claim 15, wherein the one or more memory devices further store computer-executable instructions for further causing the one or more processors to cause the linear visual effects shown on the second display panel and the third display panel to align with an edge of the corresponding first segment adjacent thereto.

18. The system of claim 1, wherein each first wheel segment includes an outer surface that includes a first illumination device.

19. The system of claim 18, wherein:

each of the first wheel segments is circumferentially interposed between two adjacent first wheel segments of the set of first wheel segments, each first wheel segment includes a first side portion and a second side portion, the first side portion includes a second surface including a second illumination device, the second side portion includes a third surface including a third illumination device, and the second and third surfaces of each corresponding first wheel segment each face towards a different one of the two first wheel segments adjacent to the corresponding first wheel segment at least when the corresponding first wheel segment and the first wheel segments adjacent thereto are all in the corresponding first wheel segment configurations.

20. The system of claim 1, further comprising:

a housing;

one or more display units; and a game controller that includes one or more processors and one or more memory devices, wherein:

the wheel display assembly is supported by the housing, the one or more processors, the one or more memory devices, the one or more display units, and the wheel display assembly are operably connected, and the one or more memory devices store computer-executable instructions for controlling the one or more processors to:

present a wagering game on the one or more display units, determine that a bonus event condition has been met, and cause, responsive at least in part to determining that the bonus event condition has been met, the actuation mechanism actuate to cause one or more of the first wheel segments to move.

* * * * *